United States Patent
Bao et al.

(10) Patent No.: US 10,000,852 B2
(45) Date of Patent: Jun. 19, 2018

(54) METHOD OF FORMING METAL DEPOSITS ON ULTRAHARD MATERIALS

(75) Inventors: Yahua Bao, Orem, UT (US); Qingyuan Liu, Provo, UT (US); Feng Yu, Lindon, UT (US); Charles J Claunch, Payson, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 579 days.

(21) Appl. No.: 12/870,304

(22) Filed: Aug. 27, 2010

(65) Prior Publication Data

US 2011/0052803 A1 Mar. 3, 2011

Related U.S. Application Data

(60) Provisional application No. 61/237,348, filed on Aug. 27, 2009.

(51) Int. Cl.
*B05D 7/00* (2006.01)
*C23C 24/08* (2006.01)
(Continued)

(52) U.S. Cl.
CPC ............. *C23C 24/08* (2013.01); *B22F 1/025* (2013.01); *C04B 35/52* (2013.01); *C04B 35/5831* (2013.01); *C04B 35/6265* (2013.01); *C04B 35/6268* (2013.01); *C04B 35/62655* (2013.01); *C04B 35/62831* (2013.01); *C04B 35/62842* (2013.01); *C04B 35/62892* (2013.01); *C04B 35/632* (2013.01); *C04B 35/6303* (2013.01); *C04B 35/645* (2013.01); *B22F 2999/00* (2013.01); *C04B 2235/326* (2013.01); *C04B 2235/3224* (2013.01); *C04B 2235/3229* (2013.01); *C04B 2235/3244* (2013.01); *C04B 2235/3262* (2013.01);
(Continued)

(58) Field of Classification Search
CPC ...................................................... C23C 24/08
USPC ........................................ 427/190; 428/312.2
See application file for complete search history.

(56) References Cited

U.S. PATENT DOCUMENTS 3,440,035 A * 4/1969 Iwase et al. .................... 75/351
5,188,643 A * 2/1993 Iacovangelo ................... 51/293
(Continued)

FOREIGN PATENT DOCUMENTS

EP 0714695 A2 6/1996
WO 2007035394 3/2007

OTHER PUBLICATIONS

Cobalt Development Institute, "Cobalt in Cemented Carbides", 2006, p. 42 http://www.thecdi.com/cdi/images/documents/facts/COBALT_FACTS-Cemented_Carbides.pdf.*
(Continued)

*Primary Examiner* — Tabatha Penny

(57) ABSTRACT

A method of forming a metal deposit on an ultra-hard material. In an embodiment, the method includes providing a plurality of ultra-hard particles, mixing the ultra-hard particles in a solution with a metal salt, drying the solution to create a mixture of metal salt particles adhered to surfaces of the ultra-hard particles, heating the mixture to convert the metal salt particles into metal deposits on the surfaces of the ultra-hard particles, and HTHP sintering the mixture of ultra-hard particles with the metal deposits to form a polycrystalline ultra-hard material.

23 Claims, 14 Drawing Sheets

(51) Int. Cl.
*B22F 1/02* (2006.01)
*C04B 35/52* (2006.01)
*C04B 35/5831* (2006.01)
*C04B 35/626* (2006.01)
*C04B 35/628* (2006.01)
*C04B 35/63* (2006.01)
*C04B 35/632* (2006.01)
*C04B 35/645* (2006.01)

(52) U.S. Cl.
CPC ........... *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3289* (2013.01); *C04B 2235/3291* (2013.01); *C04B 2235/386* (2013.01); *C04B 2235/3847* (2013.01); *C04B 2235/427* (2013.01); *C04B 2235/442* (2013.01); *C04B 2235/443* (2013.01)

(56) References Cited

U.S. PATENT DOCUMENTS

| | | | | |
|---|---|---|---|---|
| 5,304,342 | A | * | 4/1994 | Hall et al. .................. 419/11 |
| 5,352,269 | A | | 10/1994 | McCandlish et al. |
| 5,505,902 | A | * | 4/1996 | Fischer et al. .................. 419/10 |
| 5,759,216 | A | | 6/1998 | Kanada et al. |
| 6,254,658 | B1 | | 7/2001 | Toshiyuki et al. |
| 6,508,980 | B1 | * | 1/2003 | Sachs et al. .................. 419/45 |
| 6,541,115 | B2 | | 4/2003 | Pender et al. |
| 7,736,582 | B2 | * | 6/2010 | Toth .................. 264/642 |
| 7,845,438 | B1 | * | 12/2010 | Vail et al. .................. 175/434 |
| 2004/0093989 | A1 | * | 5/2004 | Fries et al. .................. 76/108.1 |
| 2007/0054101 | A1 | | 3/2007 | Sigalas et al. |
| 2007/0056778 | A1 | | 3/2007 | Webb |
| 2007/0065576 | A1 | | 3/2007 | Singh |
| 2008/0302579 | A1 | | 12/2008 | Keshavan et al. |
| 2009/0022994 | A1 | * | 1/2009 | Aminian et al. .................. 428/404 |
| 2009/0178345 | A1 | * | 7/2009 | Russell et al. .................. 51/307 |
| 2010/0300764 | A1 | | 12/2010 | Naidoo et al. |
| 2011/0052803 | A1 | * | 3/2011 | Bao et al. .................. 427/190 |

OTHER PUBLICATIONS

"Paper Chromatographic Study of Metal Beta-Diketone Chelates", Berg et al. http://pubs.acs.org/doi/abs/10.1021/ac60103a026.*

Yuvaraj et al., Thermal Decomposition of Metal Nitrates in Air and Hydrogen Environments, Journal of Physical Chemistry B, vol. 107, No. 4 (2003) at pp. 1044-1047.

Addison, C.C. and N. Logan, Anhydrous Metal Nitrates: Advances in Inorganic Chemistry and Radiochemistry; Academic Press, New York, 1964, pp. 72-142.

Ehrhardt et al., Thermal decomposition of cobalt nitrate compounds: Preparation of anhydrous cobalt(II) nitrate and its characterisation by Infrared and Raman spectra, Thermochimica Acta 432 (2005), at 36-40.

Akaishi, Minoru, et al., Synthesis of Fine-Grained Polycrystalline Diamond Compact and its Microstructure, J. Am. Ceram. Soc., 74[1] 5-10(1991).

International Search Report and Written Opinion dated Apr. 14, 2011 for corresponding application No. PCT/US2010/046969 filed Aug. 27, 2010.

International Preliminary Report on Patentability issued in International Patent Application PCT/US10/046969 dated Mar. 8, 2012. 6 pages.

Search Report 70(2) and 70a(2) EPC issued in European Patent Application 10815891.6 dated Mar. 17, 2015. 9 pages.

Norton et al., Letters to the Editors High-Pressure Sintering of WC Powder and WC-Co Mixed Powder. Rey.Sci.Intr. Trans, Jan. 1, 1952. p. 1045331. URL: https://www.jstage.jst.go.jp/article/matertransl960/8/3/8_3_207/_pdf [retrieved on Feb. 10, 2015].

* cited by examiner

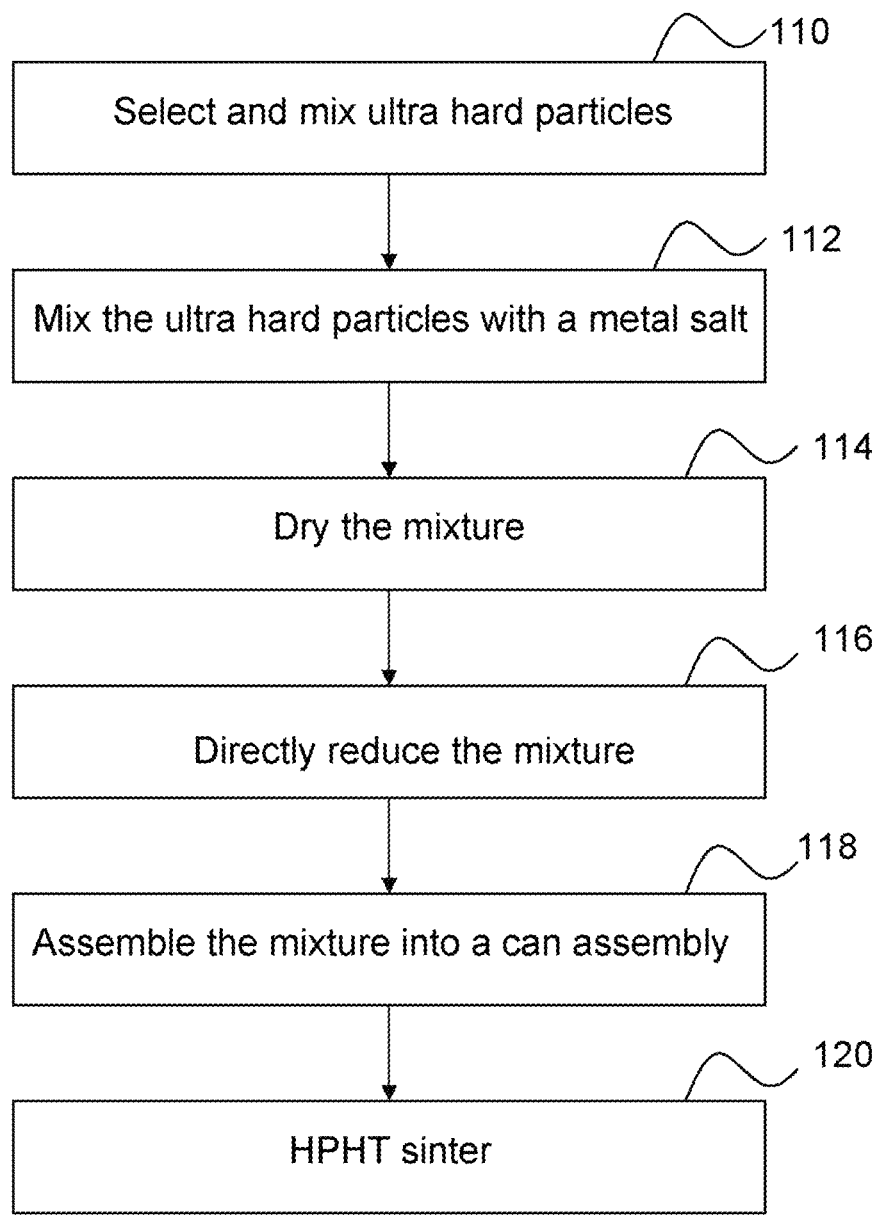

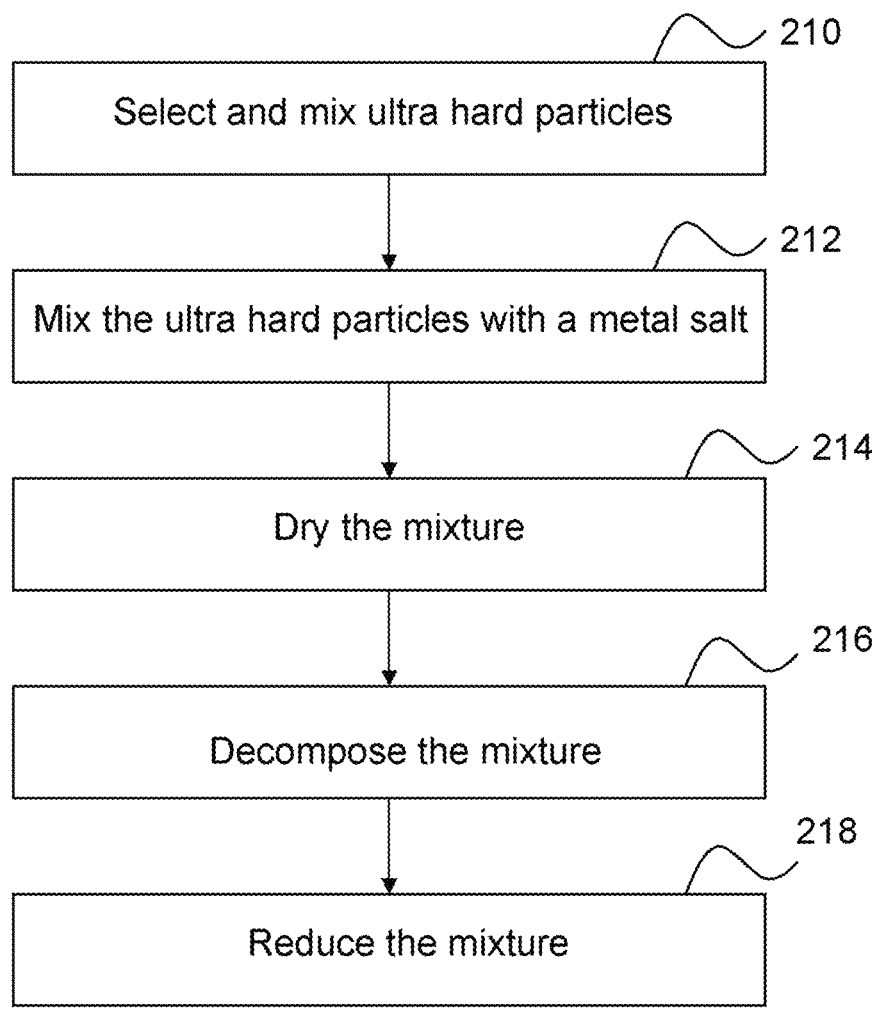

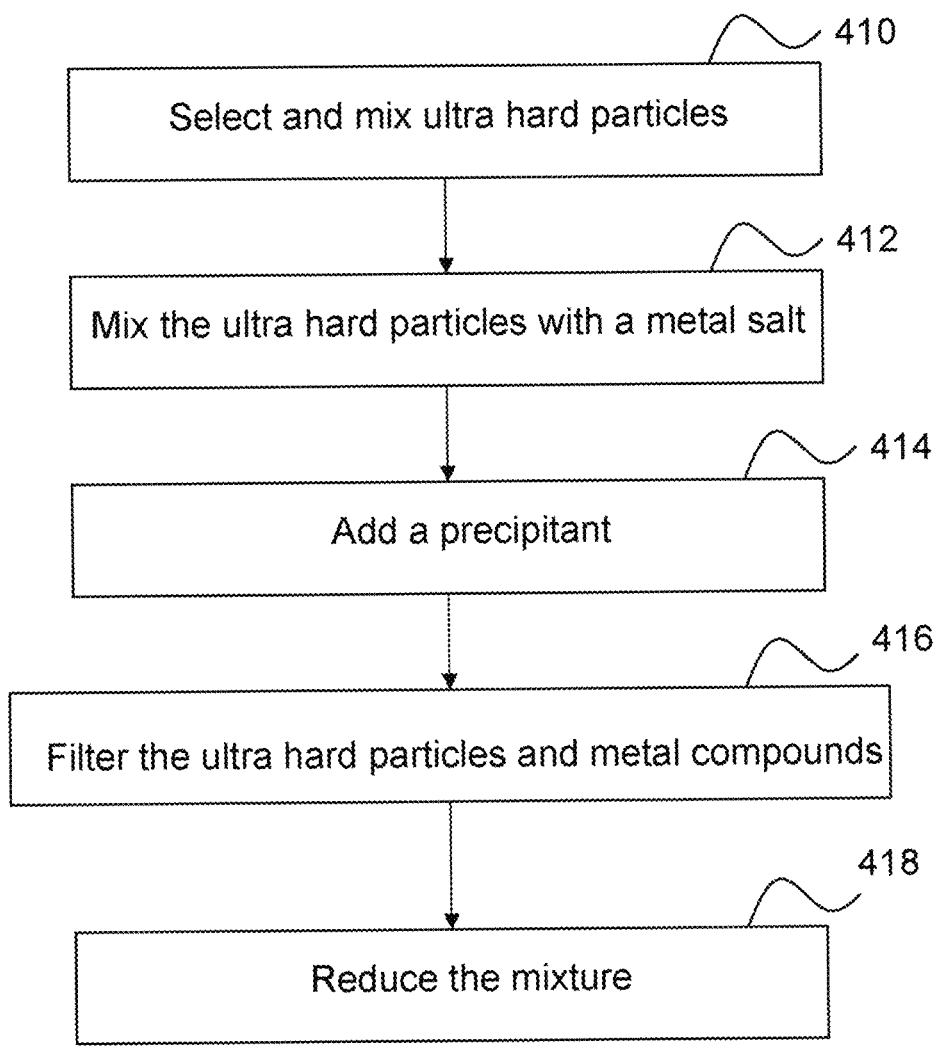

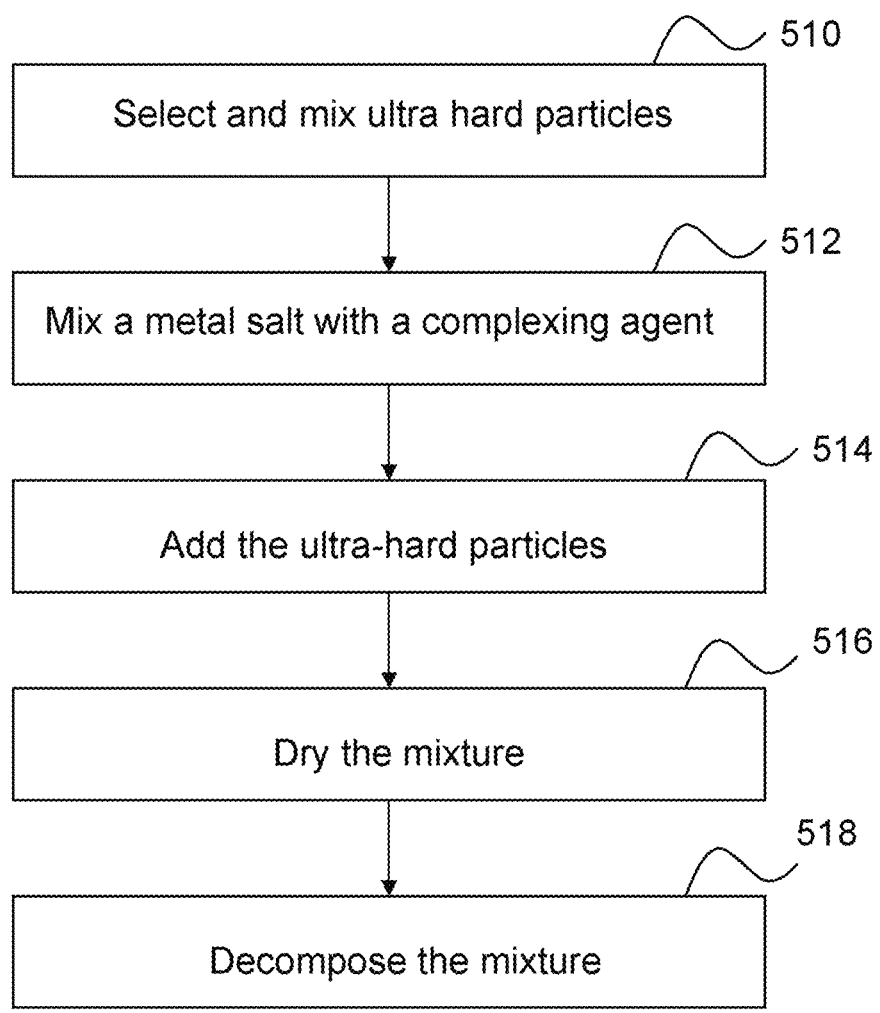

- Prior Art -

METHOD OF FORMING METAL DEPOSITS ON ULTRAHARD MATERIALS

CROSS-REFERENCE TO RELATED APPLICATIONS

This application claims priority to U.S. Provisional Application No. 61/237,348, filed Aug. 27, 2009, which is hereby incorporated by reference in its entirety.

BACKGROUND

Cutting elements, as for example cutting elements used in rock bits or other cutting tools, typically have a body (i.e., a substrate), which has an interface end or surface. An ultra hard material layer is bonded to the interface surface of the substrate by a sintering process to form a cutting layer, i.e., the layer of the cutting element that is used for cutting. The substrate is generally made from tungsten carbide-cobalt (sometimes referred to simply as "cemented tungsten carbide," "tungsten carbide" or "carbide"). Cemented tungsten carbide is formed by dispensing carbide particles in a cobalt matrix, i.e., cementing tungsten carbide particles together with cobalt. To form the substrate, tungsten carbide particles and cobalt are mixed together and then heated to solidify. The ultra hard material layer is a polycrystalline ultra hard material, such as polycrystalline diamond ("PCD"), polycrystalline cubic boron nitride ("PCBN") or thermally stable product ("TSP") material such as thermally stable polycrystalline diamond.

To form a cutting element having an ultra hard material layer such as a PCD or PCBN ultra hard material layer, diamond or cubic boron nitride ("CBN") crystals are placed adjacent the cemented tungsten carbide body in a refractory metal enclosure (e.g., a niobium can) and subjected to high temperature and high pressure so that inter-crystalline bonding between the diamond or CBN crystals occurs, forming a polycrystalline ultra hard diamond or CBN layer. Cobalt from the tungsten carbide substrate infiltrates the diamond or CBN crystals and acts as a catalyst/binder in forming the PCD or PCBN. An additional catalyst or binder material may also be added to the mixture of diamond or CBN particles to assist in inter-crystalline bonding. The process of high temperature heating under high pressure is known as high temperature high pressure sintering process ("HTHP" sintering process).

Metals such as cobalt, iron, nickel, manganese and alike and alloys of these metals have been used as the catalyst material for the diamond or CBN, to assist in inter-crystalline bonding between the diamond or CBN particles. As mentioned above, this catalyst material infiltrates the ultra-hard material layer from the substrate during HPHT sintering, and additional catalyst material may be added to the ultra-hard powder mixture prior to sintering. However, if the catalyst material is unevenly distributed throughout the ultra-hard particles, or if the catalyst material from the substrate does not fully infiltrate the ultra-hard layer, the sintered ultra-hard layer may include pockets or regions where inter-crystalline bonding did not take place. Thus, an even distribution or infiltration of catalyst material in the ultra-hard layer is desired to achieve efficient and effective sintering and to produce a uniform PCD or PCBN microstructure.

The ratio of the amount of catalyst material to ultra-hard material also affects the HTHP sintering process. Too little catalyst material (too low a ratio) results in poor sintering and an absence of inter-crystalline bonding. Too much catalyst material (too high a ratio) can interfere with the bonding between ultra-hard particles and degrade the properties of the cutting layer. Additionally, the amount of catalyst blended into the ultra-hard particle mixture prior to sintering should be carefully controlled to avoid the accumulation of too much catalyst material in the ultra-hard layer when the catalyst from the substrate infiltrates the ultra-hard layer during HPHT sintering. Without a balanced ratio of catalyst material and ultra-hard material, sintering is less efficient, the resulting PCD or PCBN microstructure is less uniform, and performance of the cutting element is degraded.

In the prior art, catalyst material has been added to the ultra-hard particle mixture by powder blending, that is, by dry mixing the catalyst (such as cobalt) and the ultra hard particles (such as diamond) together into a powder blend. The prior art also includes methods of coating ultra-hard particles with a catalyst material in an effort to achieve a uniform distribution of the catalyst material in the ultra-hard particle mixture prior to sintering. For example, U.S. Pat. No. 5,759,216 discloses a method of manufacturing a diamond sintered body, including coating the surface of each diamond particle with a sintering assistant agent. The preferred method disclosed in this patent is coating by electroless plating. Other prior art methods include chemical vapor deposition, physical vapor deposition, and atomic layer deposition. Many of these methods include complicated steps such as sensitizing the surface of the ultra-hard particles prior to depositing the metal plating.

In these prior art methods, the amount of catalyst coated on the ultra-hard particles may depend on the surface area of the ultra-hard particles. Smaller ultra-hard particles have a larger surface area per unit volume as compared to larger particles. When these smaller particles are coated with a catalyst material, the resulting ratio of catalyst material to ultra-hard particles can be hard to control. There are many variables that have to be controlled in these prior art methods in order to obtain the desired ratio of catalyst material to ultra-hard particles, and as a result it is difficult to achieve consistent coatings of the desired thickness. Thus, in the prior art, it has been difficult to achieve efficient and complete sintering of very fine ultra-hard particles, such as diamond or CBN particles with a nominal grain size less than 8 micron. Another problem with very small particles is the difficulty in uniformly wetting the surface, which causes inconsistent results in coating the surface with a catalyst. Thus, prior art coating methods often result in large variation in the amount of catalyst coated on these small ultra-hard particles, making it difficult to precisely control the amount of catalyst provided.

Some prior art methods of distributing catalyst material onto the ultra-hard particles utilize other additives in addition to the catalyst material. For example, electroless plating requires the addition of a plating catalyst such as palladium or tin. This additional material introduces impurities that degrade the sintering process and interfere with the formation of crystals in the ultra-hard layer. For example, the presence of tin in the sintered compact deteriorates performance due to the low melting point of tin. U.S. Pat. No. 6,541,115 attempts to address this issue by providing a palladium-free coating. However, this reference requires a separate activation layer comprising silver, which is deposited on the diamond before the catalyst layer is coated. Accordingly, this method still introduces additional impurities into the coating process.

Accordingly, there is a need for a method of depositing a catalyst material on an ultra-hard particle that provides a uniform distribution of catalyst material and reduces the impurities introduced into the ultra-hard particle mixture prior to sintering.

SUMMARY OF THE INVENTION

The present disclosure relates to a method of forming a metal deposit on an ultra-hard material. In one embodiment, the method includes converting a metal salt into a metal deposited on the surface of the ultra-hard particle. The method creates a very fine distribution of nano-scale metal particles on the surface of the ultra-hard particles. The method enables discrete nanoparticles of the metal to be deposited on the ultra-hard particles, instead of coating the entire surface of the ultra-hard particle. As a result, the desired ratio of catalyst metal and ultra-hard materials can be obtained, even when the ultra-hard particles have a large surface area per unit volume. Even very small ultra-hard particles can be mixed with the desired amount of catalyst to create an ultra-hard material layer that performs well under HTHP sintering, resulting in an ultra-hard material layer with uniform microstructure. Additionally, this method deposits the catalyst material without additional contaminants or impurities as is the case with electroless plating and other prior art methods.

In an embodiment, a method of forming a polycrystalline ultra-hard material includes providing a plurality of ultra-hard particles, mixing the ultra-hard particles in a solution with a metal salt, drying the solution to create a mixture of metal salt particles adhered to surfaces of the ultra-hard particles, heating the mixture to convert the metal salt particles into metal deposits on the surfaces of the ultra-hard particles, and HTHP sintering the mixture of ultra-hard particles with the metal deposits to form a polycrystalline ultra-hard material.

In an embodiment, a method of forming a polycrystalline ultra-hard material includes providing a plurality of ultra-hard particles, mixing the ultra-hard particles in a solution with a metal salt, adhering the metal salt to surfaces of the ultra-hard particles, converting the metal salt into a metal oxide adhered to the surfaces of the ultra-hard particles, converting the metal oxide into metal deposits on the surfaces of the ultra-hard particles, and HTHP sintering the ultra-hard particles with the metal deposits to form a polycrystalline ultra-hard material.

In an embodiment, a method of forming a mixture of ultra-hard material and metal includes providing a plurality of ultra-hard particles, mixing the ultra-hard particles in a solution with a metal salt, drying the solution to create a mixture of metal salt particles adhered to surfaces of the ultra-hard particles, decomposing the dried mixture to form metal oxides on the surfaces of the ultra-hard particles, and reducing the decomposed mixture to form metal deposits on the surfaces of the ultra-hard particles.

BRIEF DESCRIPTION OF THE DRAWINGS

FIG. 1 is a flowchart of a method of forming a polycrystalline ultra-hard material according to an exemplary embodiment of the present disclosure.

FIG. 6 is a flowchart of a method of forming a metal deposit on an ultra-hard material according to an exemplary embodiment of the present disclosure.

FIG. 9 is a flowchart of a method of forming a metal deposit on an ultra-hard material according to an exemplary embodiment of the present disclosure.

FIG. 11 is a flowchart of a method of forming a metal deposit on an ultra-hard material according to an exemplary embodiment of the present disclosure.

DETAILED DESCRIPTION

Figure 2A:
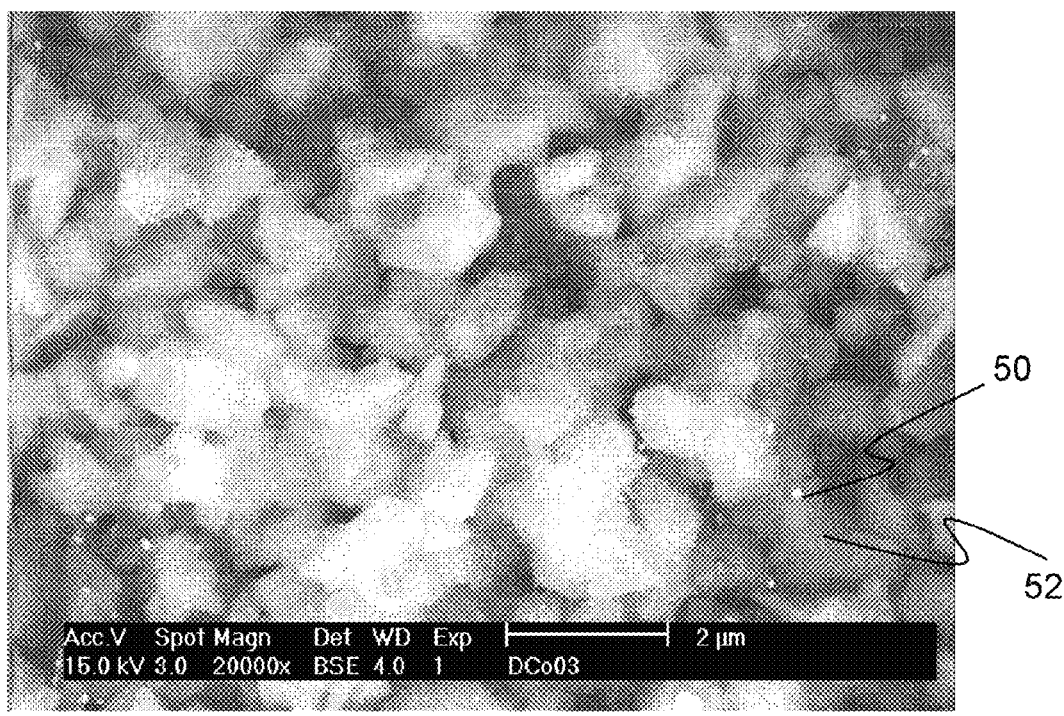
FIG. 2A is an image of a diamond powder mixture according to an exemplary embodiment of the present disclosure, at 20,000 times magnification.

The present disclosure relates to a method of forming a metal deposit on an ultra-hard material particles. In one embodiment, the method includes converting a metal salt into a metal deposited on the surface of the ultra-hard particle. The method creates a very fine distribution of nano-scale catalyst metal particles on the surface of the ultra-hard particles. The method enables discrete nanoparticles of the metal to be deposited on the ultra-hard particles, instead of coating the entire surface of the ultra-hard particle. As a result, a desired ratio of catalyst metal and ultra-hard materials can be consistently obtained, even when the ultra-hard particles have a large surface area per unit volume. Even very small ultra-hard particles can be mixed with the desired amount of catalyst to create an ultra-hard material layer that performs well under HTHP sintering, resulting in an ultra-hard material layer with uniform microstructure.

Specifically, exemplary embodiments of the present disclosure provide methods of converting metal salts to metal in order to deposit nanoparticles of a metal catalyst directly onto the surface of the ultra-hard particles. The ultra-hard particles may be mixed with a metal salt in a solution to form a coating of metal salt on the ultra-hard particles, and the metal salt coating may then be converted into discrete nano-scale deposits of pure metal on the surface of the ultra-hard particles. The use of metal salts to form the deposits of metal nanoparticles leads to a uniform distribution of the metal among the ultra-hard particles, which results in better sintering, a more uniform polycrystalline microstructure, and better performance of the ultra-hard cutting element. The uniform deposits of catalyst material on the ultra-hard particles promotes stronger bonding among the ultra-hard particles and between the ultra-hard particles and the catalyst matrix during sintering. Additionally, methods according to exemplary embodiments of the present disclosure provide careful control over the precise amount of catalyst desired to be deposited, leading to consistent results.

This method can be used for any ultra-hard material, such as diamond, CBN, or others. The exemplary embodiments discussed below involve methods of depositing a catalyst material on diamond or CBN particles, but references to diamond or CBN should not be read to exclude the substitution or addition of other ultra-hard particles, or use of a mixture or blend of different ultra-hard particles. Additionally, the catalyst material may be any metal from the iron group, including but not limited to cobalt, nickel, and iron, or combinations of iron group metals. References to cobalt in the exemplary embodiments discussed herein should not be read to exclude other metals. Further, references to metal salts such as metal nitrates below should not be read to exclude other metal salts, such as, for example, metal sulfates and metal chlorides. Finally, reduction and decomposition temperatures are provided below for specific examples of metal salts, but these temperatures are well known in the art and can be found in reference books and journals such as Yuvaraj et al., *Thermal Decomposition of Metal Nitrates in Air and Hydrogen Environments*, JOURNAL OF PHYSICAL CHEMISTRY B, vol. 107, No. 4 (2003) at pages 1044-1047 (see Table 1); see also Addison, C. C. and N. Logan, *Anhydrous Metal Nitrates: Advances in Inorganic Chemistry and Radiochemistry*; Academic Press, New York, 1964; see also Ehrhardt et al., *Thermal decomposition of cobalt nitrate compounds: Preparation of anhydrous cobalt (II) nitrate and its characterisation by Infrared and Raman spectra*, Thermochimica Acta 432 (2005), at 36-40. These temperatures may also be adjusted based on the particular metal salt being used.

An embodiment of the method is shown in the flowchart of FIG. 1. In this method, the catalyst material is provided in the form of a metal salt. In one embodiment, the metal salt is a metal nitrate, such as cobalt nitrate ($Co(NO_3)_2$). In another embodiment, the metal salt is a metal chloride, such as cobalt chloride. The metal salt is coated over the diamond or CBN surface and then directly reduced to leave a deposit of metal nanoparticles distributed across the ultra-hard surfaces.

In the exemplary embodiment of FIG. 1, the method includes selecting the desired ultra-hard particles (such as diamond, or CBN) and mixing them together 110. The mixture may include particles of the same size, or a blend of particles of various sizes. These ultra-hard particles may typically be mixed together in a powder form. Next, the method includes mixing the ultra-hard powder with a metal salt 112 in order to create a coating of metal salt over the surface of the ultra-hard particles. The metal salt may be provided in the form of a solution of the salt dissolved in water (such as cobalt nitrate dissolved in water: $Co(NO_3)_2 \cdot 6H_2O$). Mixing 112 can be done, for example, by combining the dissolved metal salt and the ultra-hard powder in water and/or alcohol and then mixing these components together in a ball mill. Mixing the ultra-hard particles and the metal salt in alcohol is beneficial, as alcohol improves the wettability of the hydrophobic ultra-hard particle surface, making the surface more receptive to the coating of the metal salt. Wet mixing of the metal salt and the ultra-hard particles creates a uniform coating of the metal salt on the diamond or CBN surface. However, mixing 112 may include other known methods of mixing, such as dry mixing. The mixing 112 creates a coating of metal salt on the surfaces of the diamond or CBN particles.

After the ultra-hard powder and the metal salt have been thoroughly mixed, the method includes drying the mixture 114, to leave behind a dried metal salt coating on the ultra-hard particle surfaces. This drying process removes the water and alcohol from the mixture. To dry, the mixture may be heated to a temperature that is no greater than the decomposition temperature of the metal salt. The drying temperature is kept below the decomposition temperature to prevent the decomposition from taking place at this stage. For example, in one embodiment, the metal salt is cobalt nitrate, and the decomposition temperature is 242° C. In one embodiment, the mixture with cobalt nitrate is heated to approximately 242° C. In another embodiment, the mixture with cobalt nitrate is heated to a temperature less than 242° C. (Notably, 242° C. is simply provided as an example, and the decomposition temperature may vary from this example.) The drying temperature can range from room temperature up to the decomposition temperature. In an exemplary embodiment, the temperature may be within the range of about 40° C. to about 100° C. Optionally, a vacuum may be applied during this dehydration in order to evacuate residual materials from the mixture. Notably, the drying 114 is performed only if the mixing 112 is wet mixing.

After the mixture has been dried and the water and/or alcohol have evaporated, the method includes directly reducing the mixture 116. In an exemplary embodiment, the mixture may be heated to at least the reduction temperature of the metal salt in a reducing atmosphere for about 2 hours, or for about 1-2 hours, to directly reduce the metal salt to pure metal. The amount of time that the mixture may be heated should be enough to ensure a complete reaction. For example, in one embodiment the amount of time may be at least one hour. In one exemplary embodiment, the metal salt is cobalt nitrate, and the mixture is heated to approximately 242° C. or higher in a hydrogen ($H_2$) atmosphere for approximately 2 hours, which causes the following reaction to take place:

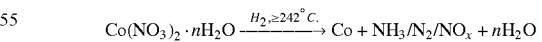

$$Co(NO_3)_2 \cdot nH_2O \xrightarrow{H_2, \geq 242°C.} Co + NH_3/N_2/NO_x + nH_2O$$

(In this equation, n can vary from zero to six, depending on the drying temperature in step 114, with a higher drying temperature resulting in more water being removed before the reduction and thus a smaller value for n.)

In this embodiment, direct reduction of the cobalt nitrate in a hydrogen atmosphere leaves behind a deposit of cobalt particles on the surface of the ultra-hard particles. The $NH_3/N_2/NO_x$ evaporates during the reduction, leaving pure cobalt behind. The metal salt coating on the ultra-hard particles is reduced to discrete deposits of pure metal nano-scale particles (less than 100 nm in diameter) on the surface of the ultra-hard particles.

This method is referred to as "direct reduction" because decomposition and reduction of the metal salt happen together by heating the mixture to at least the reduction temperature, in a reducing atmosphere. The reducing atmosphere can be hydrogen. Other reducing atmospheres may be used as well, such as carbon monoxide. The decomposition of the metal salt into metal oxide and the reduction of the metal oxide into pure metal happen together, simultaneously, during the direct reducing 116. In other exemplary embodiments described below, the decomposition and reduction are done sequentially. In the exemplary embodiment of FIG. 1, they are done together, hence the term "direct reduction."

After directly reducing the mixture and forming the metal deposits, the method includes assembling the mixture into a can assembly 118, typically with a substrate, and then sintering at high temperature and high pressure ("HPHT sintering") 120. The method may also include optional cleaning steps before and/or after assembling the materials into a can, in order to evacuate any oxides or other residual materials from the ultra-hard material prior to sintering. Cleaning can include heating the mixture and applying a vacuum to remove these residual materials.

Four mixtures were prepared according to an exemplary embodiment of this method to evaluate the resulting deposit of catalyst material on the ultra-hard particles, using cobalt nitrate as the metal salt. Each mixture included 50 grams of diamond powder having diamond particles approximately 0.5 to 1 micron in size. The compositions of the four mixtures were as follows:

TABLE 1

Metal Salt Mixtures

| | Mixture | | | |
|---|---|---|---|---|
| | 1 | 2 | 3 | 4 |
| Co content (wt %) | 3 | 6 | 9 | 12 |
| Diamond content (g) | 50 | 50 | 50 | 50 |
| $Co(NO_3)_2 \cdot 6H_2O$ (g) | 7.64 | 15.76 | 24.42 | 33.67 |
| $H_2O$ (ml) | 3 | 6 | 9 | 12 |
| Alcohol (ml) | 20 | 20 | 20 | 20 |

In each case, the cobalt nitrate and the diamond powder were mixed together in 20 mL of alcohol and varying amounts of water, as shown in Table 1 above. After mixing and drying, the mixture was reduced in a hydrogen atmosphere at 500° C. for 2 hours. The diamond particles were then viewed under a scanning electron microscope (SEM). The results are shown in FIGS. 2-5. The weight percentage of cobalt shown in Table 1 above is the percentage of cobalt by weight in the reduced mixture of cobalt and diamond.

Figure 2B:
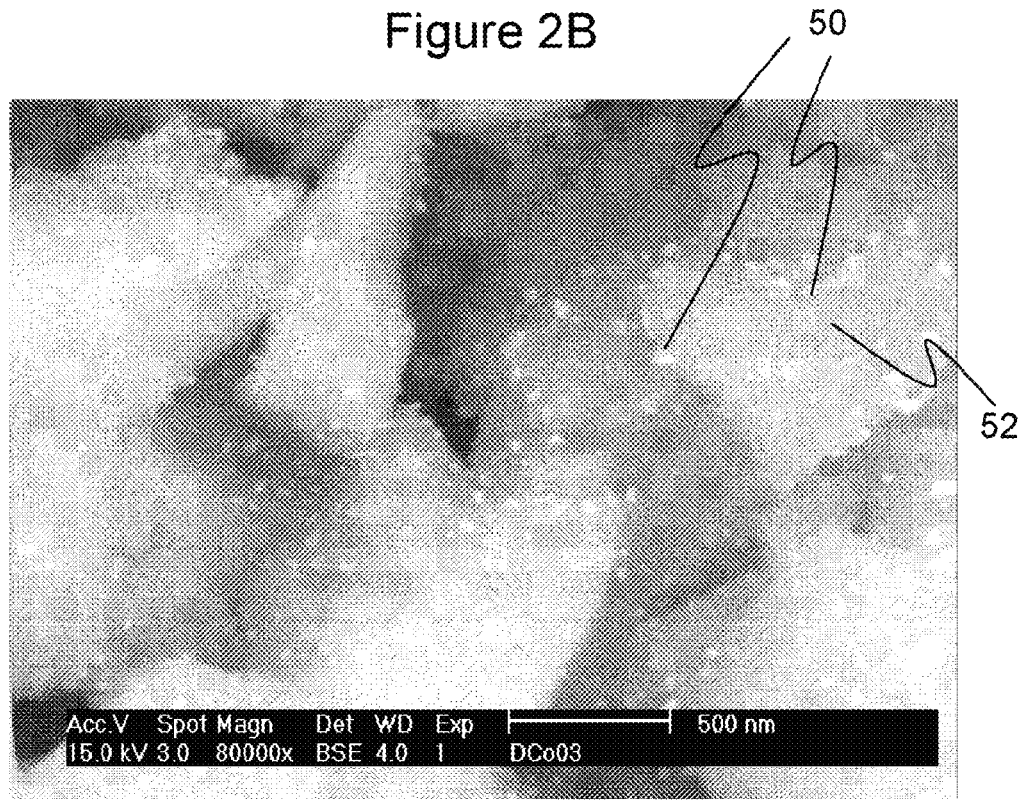
FIG. 2B is an image of the diamond powder mixture of FIG. 2A, at 80,000 times magnification.

The SEM images of Mixture 1, as shown in FIGS. 2A-B, show discrete nano-sized cobalt particles 50 adhered to the surface of the diamond particles 52. Mixture 1 included 3% by weight cobalt, which resulted in cobalt particles 50 spaced apart from each other and spread out over the diamond surfaces 52. Based on the scale of these images, the cobalt particles 50 have an average diameter of approximately 50 nm.

Figure 3A:
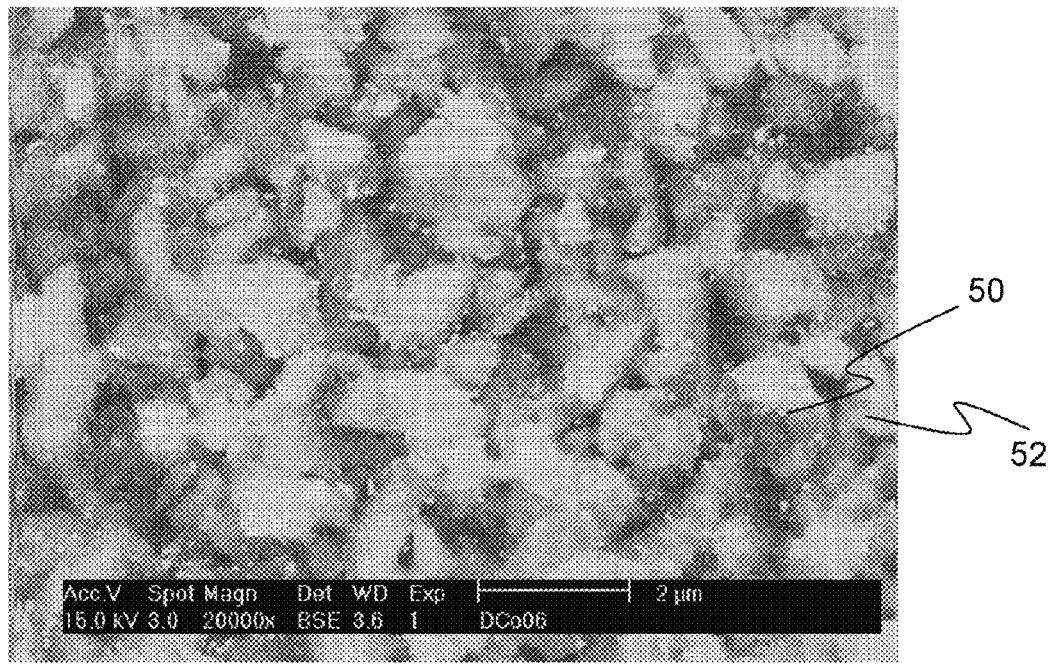
FIG. 3A is an image of a diamond powder mixture according to an exemplary embodiment of the present disclosure, at 20,000 times magnification.
Figure 3B:
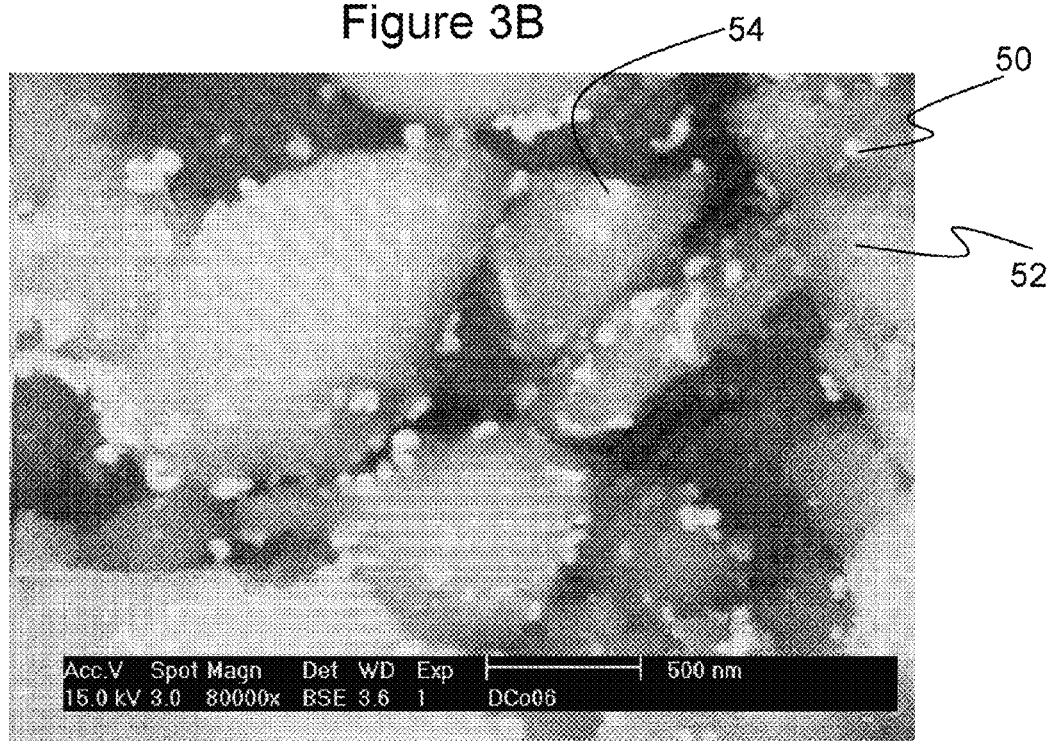
FIG. 3B is an image of the diamond powder mixture of FIG. 3A, at 80,000 times magnification.

FIGS. 3A-B show the mixture with 6% by weight cobalt, and the comparison between FIGS. 2 and 3 shows an increase in the number of cobalt particles 50 in the 6% cobalt mixture. In FIGS. 3A-B, the cobalt particles 50 cover more of the diamond surface 52, and a few cobalt particles 50 have stuck together in a clump 54. Overall they are still formed as discrete cobalt particles 50 spread out over the diamond surface 52.

Figure 4A:
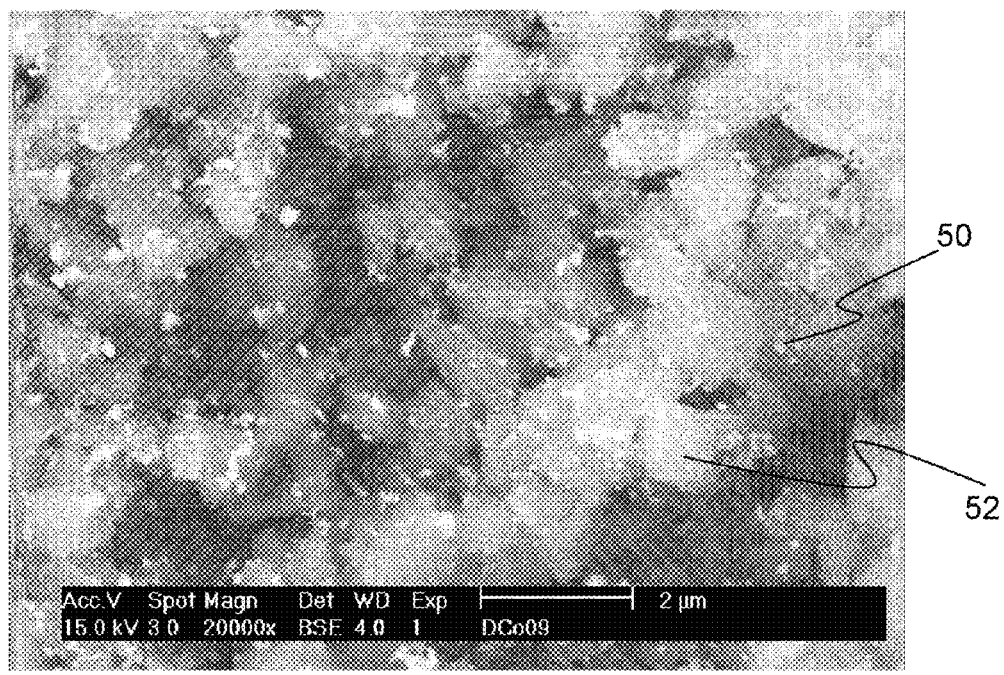
FIG. 4A is an image of a diamond powder mixture according to an exemplary embodiment of the present disclosure, at 20,000 times magnification.
Figure 4B:
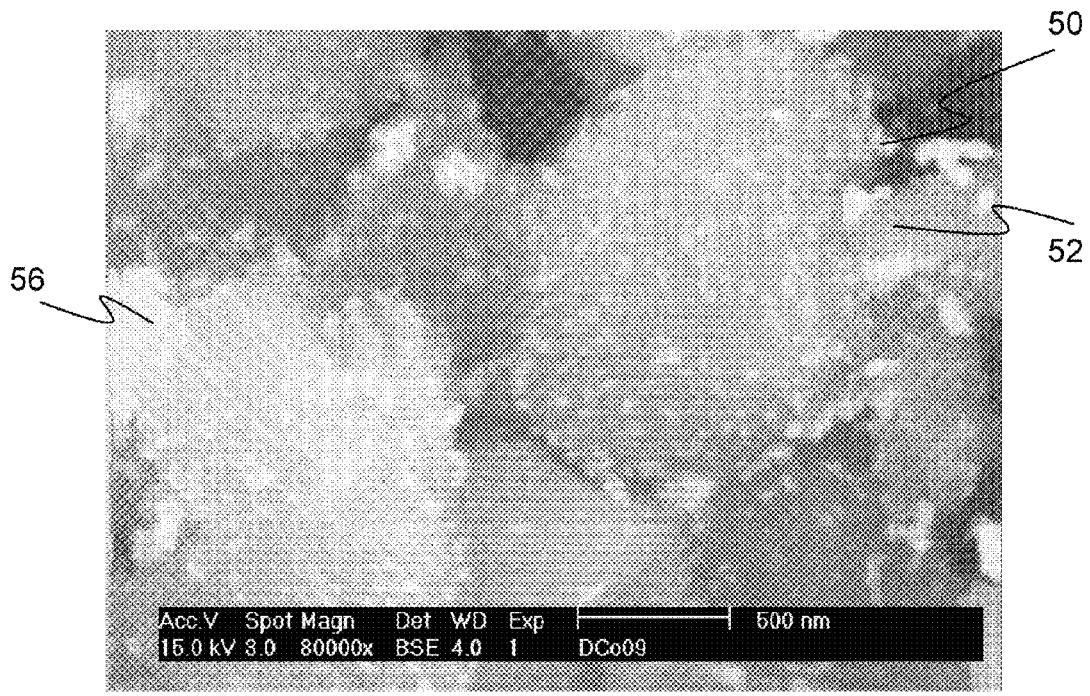
FIG. 4B is an image of the diamond powder mixture of FIG. 4A, at 80,000 times magnification.

FIGS. 4A-B show the diamond and cobalt particles from the 9% cobalt mixture. These images show another increase in the number of cobalt particles 50 adhered to the diamond surface 52. However, in these images, more of the cobalt particles have begun to stick together, forming larger clumps 56 of cobalt particles in some areas, rather than discrete, spaced-apart cobalt particles 50. Thus, at 9% cobalt by weight, the cobalt is beginning to form a partial coating over the diamond surface. However, many of the cobalt particles 50 are spread apart from each other and evenly distributed across the diamond surfaces 52. Thus, some nano-scale cobalt particles 50 coexist with the areas of cobalt coating 56.

Figure 5A:
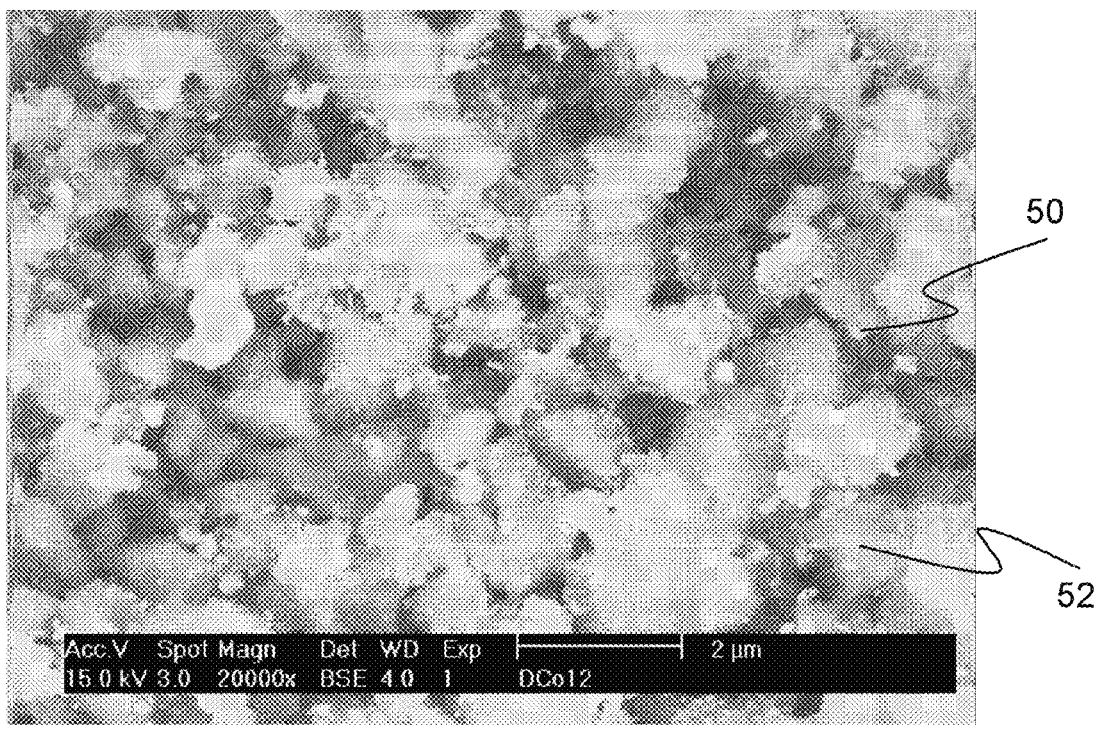
FIG. 5A is an image of a diamond powder mixture according to an exemplary embodiment of the present disclosure, at 20,000 times magnification.
Figure 5B:
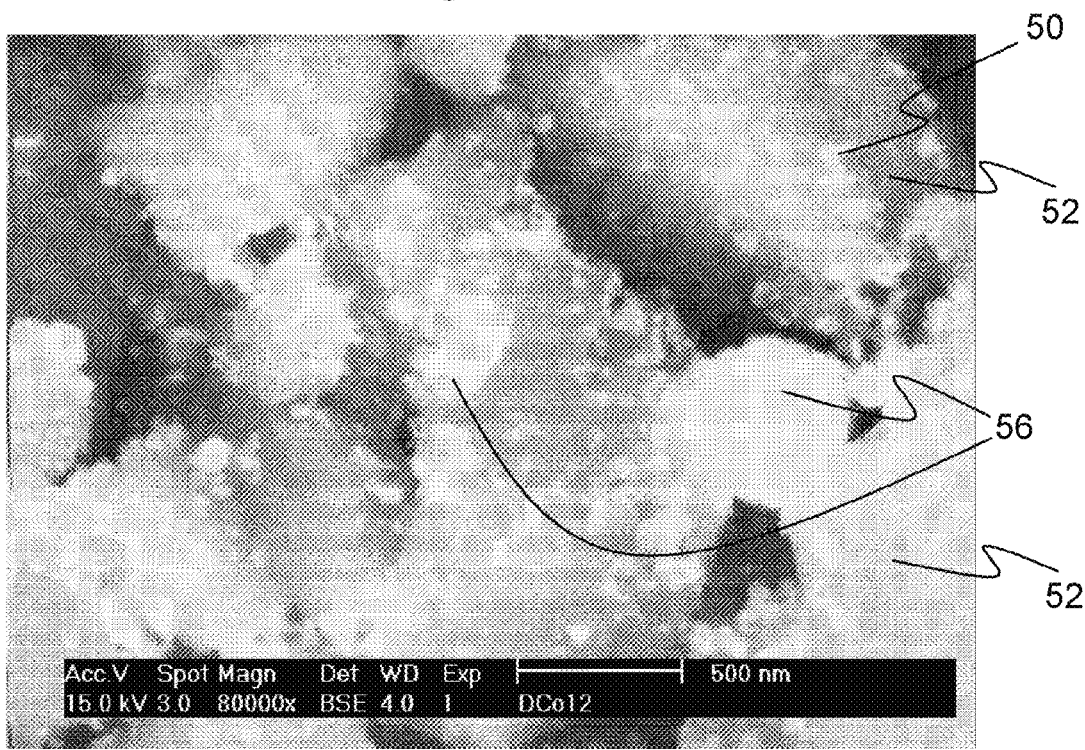
FIG. 5B is an image of the diamond powder mixture of FIG. 5A, at 80,000 times magnification.

Finally, FIGS. 5A-B show the diamond and cobalt particles from the 12% cobalt mixture. In this case, larger clumps of cobalt particles 56 are visible, and the distribution of cobalt particles 50 across the diamond surfaces 52 appears to be less uniform. The cobalt deposit is beginning to form a partial coating 56 across the diamond particles 52 rather than forming discrete spaced-apart cobalt particles. Again, some discrete nano-scale cobalt particles 50 coexist with this coating.

These SEM images confirm the formation of discrete cobalt nanoparticles on the diamond surface. The images also show a uniform distribution of these cobalt nanoparticles across the diamond surfaces, with more homogeneity at lower cobalt percentages. With lower amounts of cobalt, the method formed isolated nanoparticles attached to and spread out across the diamond particle surface. As the amount of cobalt increases, the method forms a coexisting mixture of cobalt nanoparticles and partial coatings on the diamond particles. Thus, a homogeneous mixture of diamond and cobalt can be achieved through the direct reduction of cobalt nitrate. The catalyst is deposited in discrete, spaced-apart deposits, rather than only a uniform coating or plating.

In the embodiments described above, the method of depositing the catalyst on the ultra-hard particles enables the amount of catalyst deposited to be precisely controlled, so that the desired amount of catalyst material per surface area of ultra-hard particles can be achieved, as indicated in the varying amounts of cobalt shown in FIGS. 2-5. In embodiments of the method, substantially all of the metal that is initially provided in the form of a metal salt may be converted into metal deposits on the ultra-hard particle surfaces. The amount of metal from the metal salt that is converted into the metal deposits on the ultra-hard particles is expected to be 100%. Thus, the amount of metal salt that should be provided in order to obtain the desired amount of catalyst on the ultra-hard surface can be determined. For example, if the desired mixture of diamond and cobalt is 100 g, with 3% cobalt by weight, then this mixture includes 3 g of cobalt. Thus, the amount of cobalt nitrate that is initially provided should include 3 g of cobalt. This amount can be calculated from the atomic weights of the cobalt, nitrogen, and oxygen in cobalt nitrate. As shown in Table 1, the amount of cobalt nitrate was calculated to be 7.64 g for the 3% cobalt mixture. Thus, the desired amount of cobalt can be directly controlled by calculating and providing the corresponding amount of cobalt salt at the beginning of the method.

As shown in Table 1 above, the amount of cobalt salt can be adjusted to provide 3%, 6%, 9%, or 12% cobalt by weight. The result is ultra-hard particles as shown in FIGS.

2-5, with 3%, 6%, 9%, or 12% cobalt by weight. That is, the desired amount of catalyst can be directly controlled by the initial amount of metal salt provided in the mixture. In an exemplary embodiment, up to 20% or up to 25% by weight catalyst material (such as cobalt) can be provided. In another exemplary embodiment, the amount of catalyst may be within the range of about 5% to about 20%. In another exemplary embodiment, the amount of catalyst may be within the range of about 1% to about 25%.

As mentioned before, it is expected that 100% of the metal from the metal salt is converted into metal deposits. When the amount of metal is less than about 10% by weight, it is expected that 100% of the metal will be adhered to the ultra-hard particle surfaces. However, as the amount of metal is increased, for example, above about 10% by weight, it is possible that some of the metal deposits will not be directly adhered to the ultra-hard particle surfaces, but may be resting between ultra-hard particles. It is desirable to have a majority of the metal particles attached to the ultra-hard particle surfaces, rather than simply resting between ultra-hard particles, in order to obtain uniform sintering. Such metal particles will be sintered along with the other metal deposits adhered to the ultra-hard particle surfaces. Thus, 100% of the metal that is initially provided in the form of metal salt is converted into metal deposits and sintered with the ultra-hard particles, even if less than 100% of the metal deposits are actually attached to the ultra-hard particle surfaces. The exact ratio of metal deposits that are attached to the ultra-hard particle surfaces to those that are not attached is difficult to determine. As an example, in the embodiment of FIGS. 4A-4B, it is expected that greater than 90% of the cobalt particles are attached to the diamond particle surfaces, based on the SEM images shown in those figures.

The exemplary method shown in FIG. 1 provides tighter control over the amount of catalyst deposited on the ultra-hard particles as compared to the prior art. In prior art methods such as electroless plating, only a portion of the metal provided at the beginning of the method is actually deposited onto the surface of the ultra-hard particles. For example, in electroless plating methods, only a portion of the metal solution that is in contact with the ultra-hard particle surfaces reacts with the surface and is deposited as a catalyst coating on the surface. The amount of catalyst deposited on the ultra-hard surface does not directly depend on the amount of catalyst provided in the initial electroless plating solution. To exert control over the amount of catalyst metal deposited on the ultra-hard particle surfaces, additional variables and factors such as the duration of exposure must be carefully controlled. Thus, with prior art methods, a desired amount of catalyst cannot be obtained simply by adjusting the amount of metal in the solution. Other variables have to be precisely controlled as well.

The method shown in FIG. 1 can be utilized with a wide variety of metal deposits on diamond or CBN. The starting materials can be any metal salt (inorganic or organic) that can be reduced in a reducing atmosphere such as hydrogen or any other reducing atmosphere. For example, the following metal nitrates may be utilized: $Mn(NO_3)_2$, $Fe(NO_3)_3$, $Co(NO_3)_2$, $Ni(NO_3)_2$, $Cu(NO_3)_2$, $Zn(NO_3)_2$, $ZrO(NO_3)_2$, $Ce(NO_3)_3$, $Gd(NO_3)_3$, $Pd(NO_3)_2$, $Pt(NH_3)_4(NO_3)_2$, $Rh(NO_3)_3$, and $AgNO_3$.

Another exemplary embodiment of the present disclosure is shown in FIG. 6. In this method, the decomposition and reduction steps are separated and performed sequentially. Thus, this method can utilize chemicals that cannot be directly reduced. The decomposition and reduction steps are separated by first heating the mixture in an inert atmosphere or air or vacuum, to a temperature above the decomposition temperature of the metal salt, in order to decompose the metal salt, and then subsequently heating in a reducing atmosphere such as hydrogen or carbon monoxide at a temperature above the reduction temperature of the metal salt.

As shown in FIG. 6, the method includes selecting the desired mixture of ultra-hard particles and mixing them together 210 to create a uniform distribution of ultra-hard particles of the desired sizes. The method then includes mixing this ultra-hard mixture with a metal salt 212, such as cobalt nitrate. As in the embodiment of FIG. 1, the metal salt may be dissolved in water and mixed with the ultra-hard particles in a water and/or alcohol solution. The method then includes drying the mixture 214, and then decomposing the mixture 216 to form a metal oxide. To decompose the metal salt into a metal oxide, the mixture is heated, optionally under a vacuum, to a temperature greater than the decomposition temperature of the metal salt, such as about 150° C. to about 500° C. This heat causes the metal salt to form an oxide that is adhered to the surface of the ultra-hard particles. The decomposition can be done in any inert atmosphere, such as argon, or in air (if the temperature is below 500° C.), or optionally under a vacuum.

In one embodiment, the drying 214 and decomposing 216 happen at the same time, by spray drying. Spray drying is a technique that is known in the art. In this embodiment, the diamond suspension is sprayed under pressure into a hot furnace, at a temperature between about 150° C. to about 300° C. The furnace includes air or an inert gas. The diamond mixture dries and decomposes at the same time.

Finally, the method includes reducing the mixture 218. Reducing 218 includes heating the mixture to at least the reduction temperature of the metal salt, or a higher temperature, in a reducing atmosphere such as hydrogen, to cause the oxygen from the metal oxide to evaporate, leaving behind a deposit of pure metal. In an embodiment, the mixture is heated to a temperature above 300° C. The result is discrete catalyst metal nanoparticles deposited on the surfaces of the ultra-hard particles. As described before, the mixture of ultra-hard particles and catalyst metal can then be assembled into a can assembly and HPHT sintered to form PCD or PCBN.

A mixture of diamond particles was prepared according to the method of FIG. 6, as follows: 2.5 grams of cobalt nitrate hydrate $(Co(NO_3)_2 \cdot 6H_2O)$ was dissolved into 20 g of isopropanol and then mixed (by stirring) with 9.5 g pre-mixed diamond powder. The suspension was then dried under an air flow at 50° C. while stirring. The dried mixture was then heated to a temperature less than 300° C. under vacuum to decompose the nitrate into an oxide. The mixture turned to a black and grey color during this decomposition step. Finally, the mixture was reduced in a hydrogen atmosphere at a temperature in the range of 500 to 1050° C., to achieve a deposit of cobalt nanoparticles on the diamond powder surface. In this example, the cobalt comprised 5% by weight of the diamond powder mixture.

Figure 7:
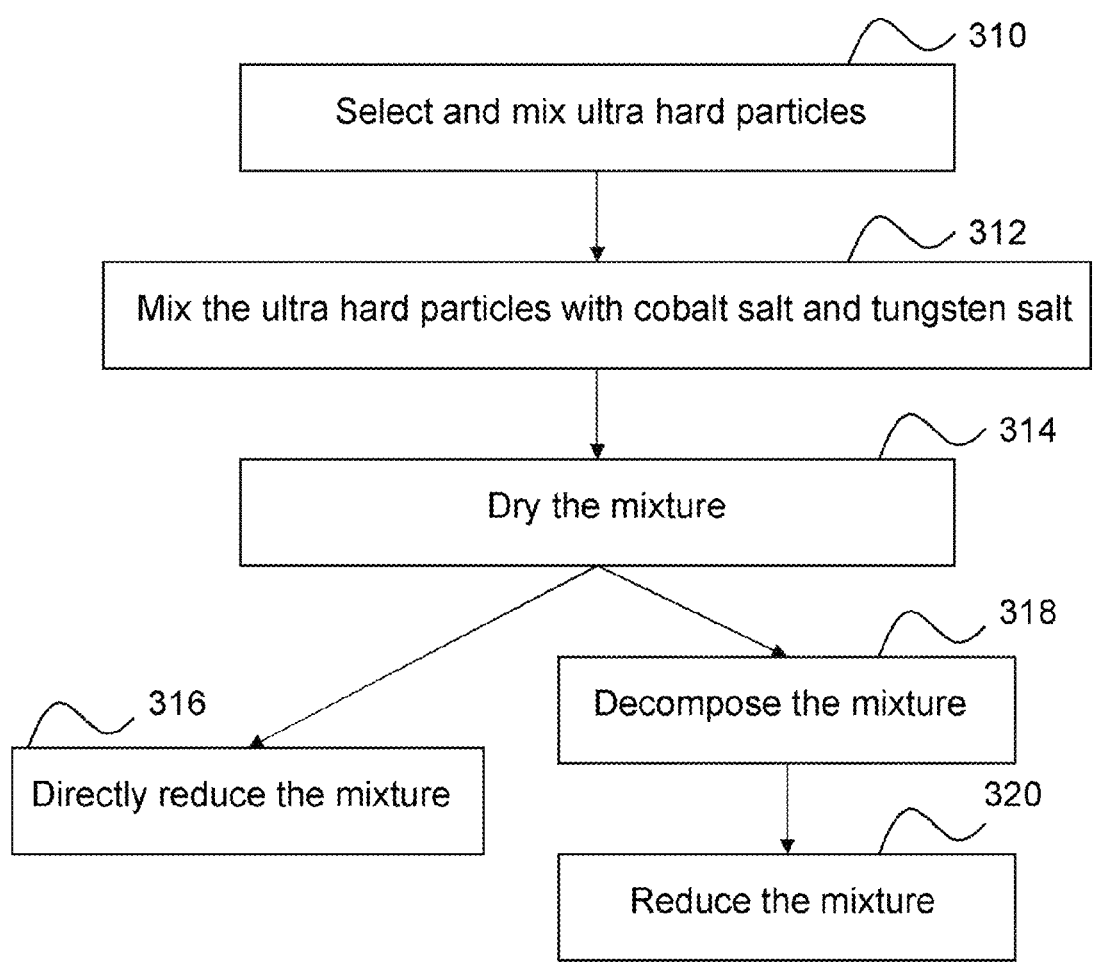
FIG. 7 is a flowchart of a method of forming a metal deposit on an ultra-hard material according to an exemplary embodiment of the present disclosure.

Another exemplary embodiment of the present disclosure is shown in FIG. 7. In this embodiment, tungsten salt and cobalt salt are mixed with the ultra-hard particles. This embodiment is not limited to cobalt salts, as other metal salts such as for example iron salt or nickel salt may be used. Tungsten is also added so that tungsten carbide may be created during the HPHT sintering process. Tungsten carbide acts as a grain growth inhibitor during HPHT sintering of diamond particles, and is desired in some applications in order to control the growth of diamond crystals during the HPHT sintering. Nb, Ta, Ti, and other salts may also be used in place of or in addition to the tungsten salt, in order to form carbides which act as grain grown inhibitors for PCD. In other embodiments, the tungsten salt (or Nb, Ta, Ti, and other salts) may be used with conventional catalyst material (without the use of discrete deposits of catalyst metal) such that only tungsten metal deposits are formed on the surface of the ultra-hard particles. Tungsten, niobium tantalum, titanium as well as other metals may be used as carbide-forming metals.

As shown in FIG. 7, the method in this exemplary embodiment includes selecting and mixing the desired ultra-hard particles 310, as before. The method then includes mixing the ultra-hard particles with both a cobalt salt and a tungsten salt 312. The ultra-hard particles and salts are mixed in water, rather than alcohol, as tungsten cannot dissolve in alcohol. The method includes drying the mixture 314, to form a mixture of ultra-hard particles with tungsten salts and cobalt salts adhered to the ultra-hard particle surfaces. In an embodiment, drying 314 includes spray-drying the mixture. Drying can be accomplished very quickly with spray-drying, which can be beneficial to avoid settlement or separation of the liquid and solid particles during drying. Spray-drying can be utilized in any of the embodiments of the present disclosure described herein where drying is called for. This method can be used with either direct reduction or sequential decomposition and reduction. Thus, the method can include directly reducing 316 to form metal deposits on the ultra-hard particle surface. Alternatively, the method includes sequentially decomposing 318 and reducing 320 the mixture, to form metal oxide adhered to the ultra-hard particles and then convert the metal oxide into deposits of metal on the ultra-hard particle surfaces, as described before.

A mixture of diamond particles was prepared according to the method of FIG. 7, as follows: 4.9 g of cobalt nitrate dissolved in water ($Co(NO_3)_2 \cdot 6H_2O$) and 0.41 g of $(NH_4)_6W_{12}O_{39} \cdot xH_2O$ (ammonia metatungstate hydrate) were dissolved in 30 g of de-ionized water and mixed to form a clear solution, and then 8.7 g pre-mixed diamond powder (grain size 0.5-1.0 microns) was added and mixed by stirring. The suspension was dried under an air flow at 100° C. while stirring. The mixture was then directly reduced by heating in a hydrogen atmosphere at 1025° C. The result was a mixture of diamond particles with 10% by weight cobalt nano-particles and 3% by weight tungsten nano-particles deposited on the diamond surface. In other embodiments, the amount of tungsten can range up to 10% by weight, and the cobalt can range up to 20% or 25% by weight.

Figure 8:
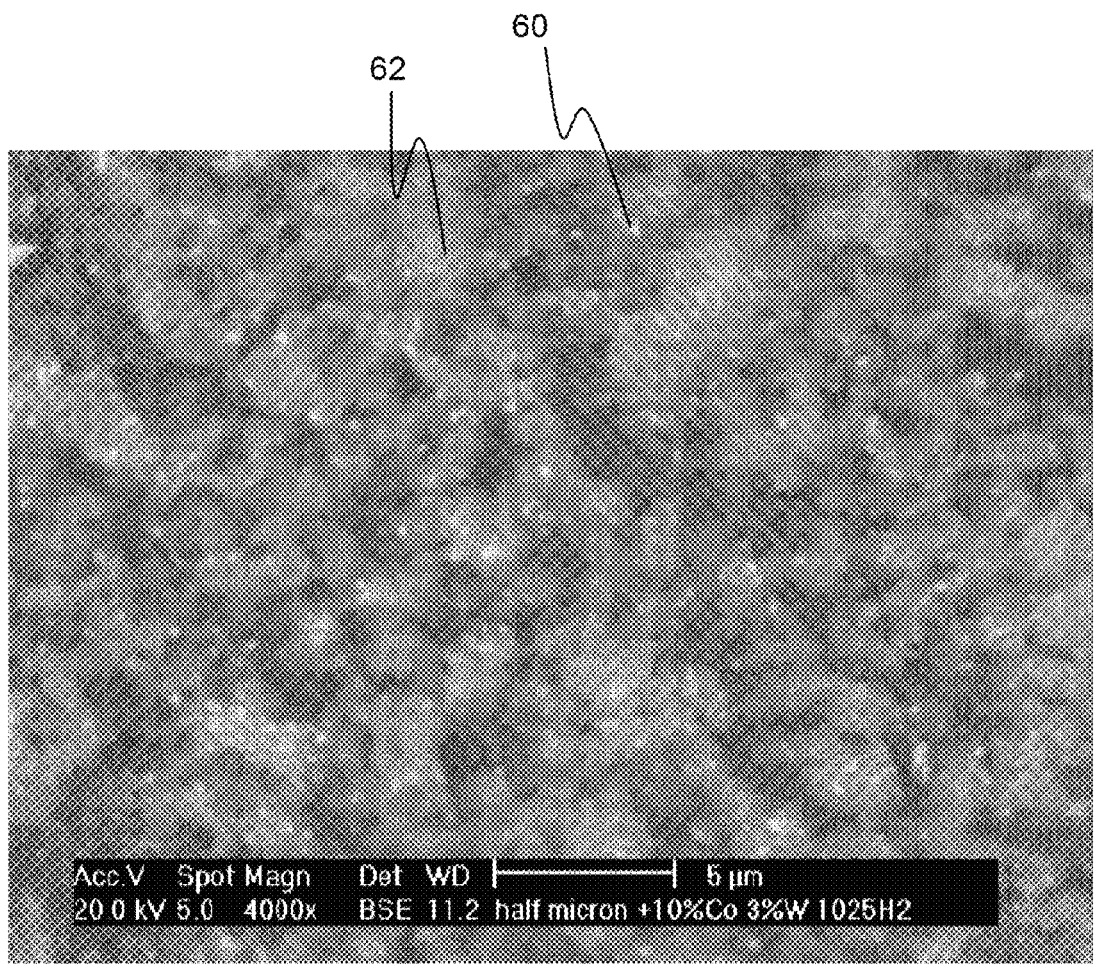
FIG. 8 is an image of a diamond powder mixture according to an exemplary embodiment of the present disclosure, at 4,000 times magnification.

An SEM image of the resulting mixture is shown in FIG. 8. This image shows the diamond powder 62 with tungsten cobalt alloy particles 60 deposited on the surface of the diamond particles 62. As before, this mixture can be assembled into a can assembly and then HPHT sintered to create PCD (or PCBN if CBN is used as the ultra-hard material). The tungsten in the mixture forms tungsten carbide during the HPHT sintering, which acts as a grain growth inhibitor to control the growth of diamond crystals and prevent the growth of abnormal crystals.

Another exemplary embodiment is shown in FIG. 9. In this method, the catalyst material is provided in the form of a metal salt that is mixed with ultra-hard powder and then precipitated and finally reduced to achieve nano-scale metal particles deposited on the ultra-hard particle surfaces.

As shown in FIG. 9, the method includes selecting and mixing the desired ultra-hard particles 410, as in any of the previous embodiments. The method then includes mixing the ultra-hard particles with a metal salt 412, such as cobalt nitrate. The metal salt is dissolved in water forming a solution, and the ultra-hard particles are mixed into the solution. The method then includes adding a precipitant 414, such as ammonium hydrogen carbonate ($NH_4HCO_3$), which can be used for cobalt salts as well as other metal salts. The precipitant raises the pH of the solution and reacts with the metal salt to create one or more metal compounds that can be precipitated out of the solution. For example, when the metal salt is cobalt nitrate, the precipitant reacts with the cobalt nitrate to form a mixture of cobalt carbonate and cobalt hydroxide. The metal compounds precipitate out of the solution and adhere to the surfaces of the ultra-hard particles. The method then includes filtering the ultra-hard particles with these adhered metal compounds from the solution 416. The method then includes reducing the mixture 418. Reduction of the metal compound precipitates leaves behind pure metal deposits on the surface of the ultra-hard particles.

A mixture of diamond and cobalt particles was formed according to the method of FIG. 9, as follows: 4.9 g of cobalt nitrate hydrate ($Co(NO_3)_2 \cdot 6H_2O$) was dissolved into 50 g of de-ionized water, and then 9.0 g of pre-mixed diamond powder (0.5-1.0 micron) was added and mixed by stirring. One mole of the precipitant, $NH_4HCO_3$, was added to the solution and stirred. This precipitant caused the formation of cobalt carbonate ($CoCO_3$) and cobalt hydroxide ($Co(OH)_2$). After the suspension reached a pH of 8.0, the diamond powder with the deposited cobalt compounds was filtered out from the suspension and dried. The mixture was then reduced by heating at 775° C. in a hydrogen atmosphere. The result was a diamond powder mixture with 10% by weight nano-sized cobalt particles adhered on the diamond powder surface.

Figure 10A:
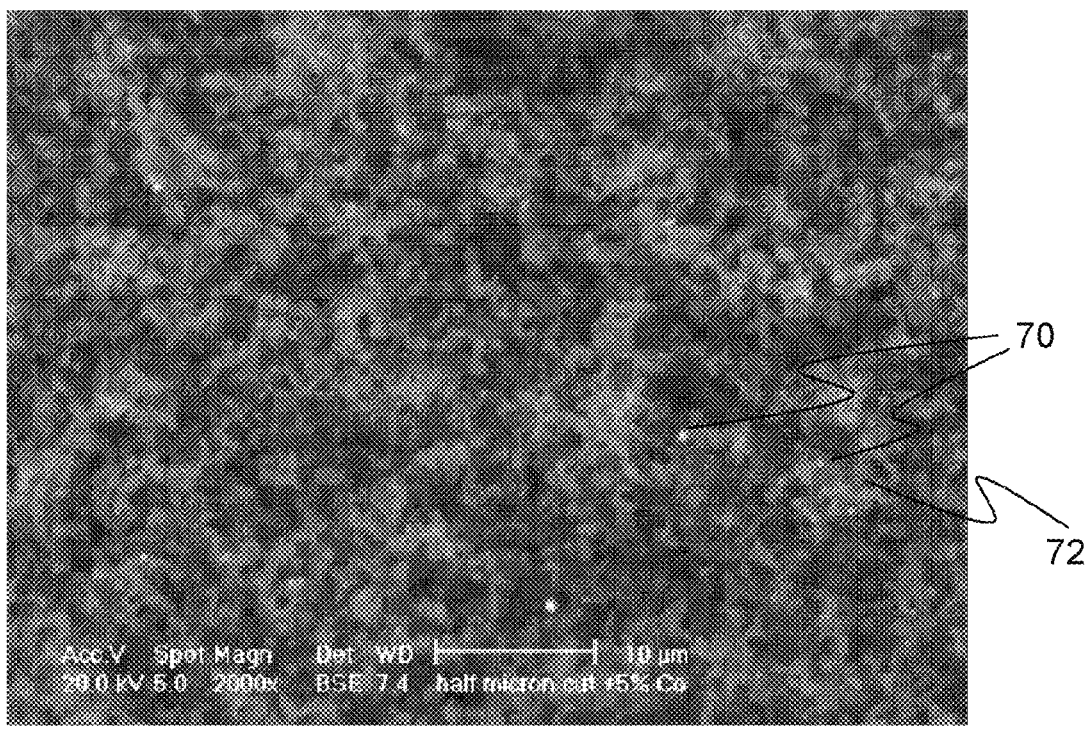
FIG. 10A is an image of a diamond powder mixture according to an exemplary embodiment of the present disclosure, at 2,000 times magnification.
Figure 10B:
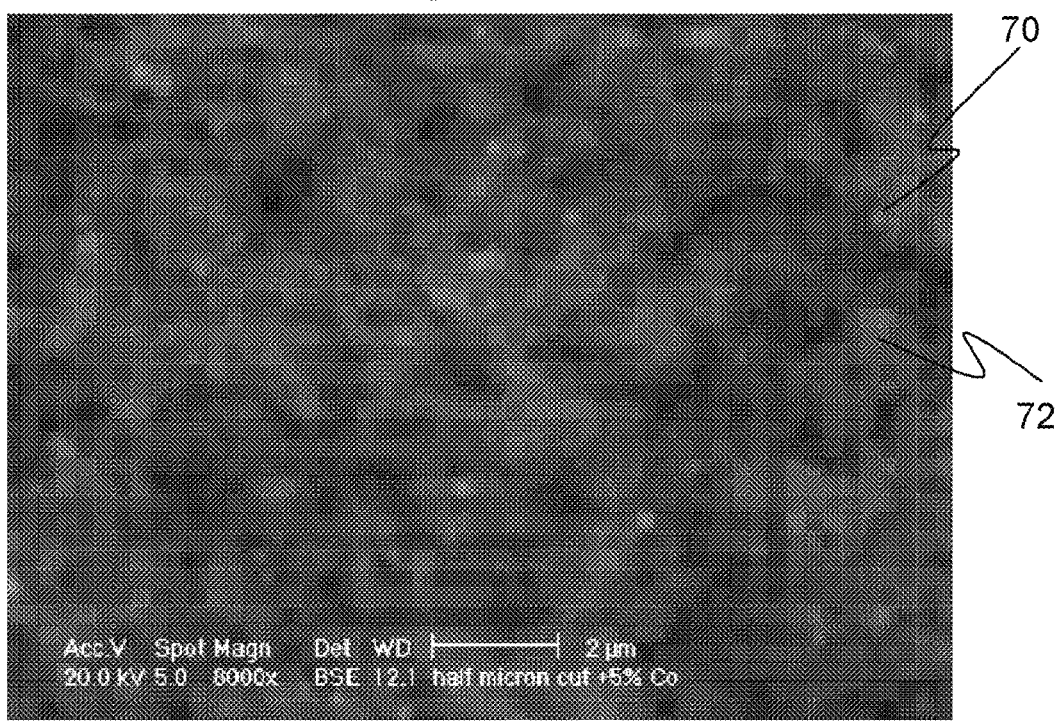
FIG. 10B is an image of the diamond powder mixture of FIG. 10A, at 8,000 times magnification.

The above mixture was also created with 5% by weight cobalt particles, and images of this diamond and cobalt mixture are shown in FIGS. 10A-B. These images show discrete nano-scale cobalt particles 70 uniformly deposited over the diamond particle surfaces 72.

Although $NH_4HCO_3$ was utilized in the example immediately above, other precipitants may be used, such as ammonia bicarbonate, carbonates, oxalic acid, and many bases. The precipitant should be able to dissolve in water and react with the metal salt to form one or more precipitated metal compounds.

Another exemplary embodiment is shown in FIG. 11. In this embodiment, a complexing agent is added to the mixture of ultra-hard particles and metal salt, and the mixture is decomposed to create the desired pure metal deposits on the ultra-hard particles. Due to the addition of the complexing agent, a separate reducing step, or a direct reducing step, is not necessary. The complexing agent is added to avoid salt recrystallization during drying.

As shown in the embodiment of FIG. 11, the method includes selecting and mixing the desired blend of ultra-hard particles 510, and then separately mixing a metal salt, such as cobalt, nickel, or iron salts, or a blend thereof, with a chelating or complexing agent 512, such as, for example, triethanolamine. A complexing agent is a substance capable of forming a complex compound with another material in solution. The complexing agent and the metal salt are mixed in water or alcohol. The method then includes adding the ultra-hard particles to the mixture 514 and stirring to mix. The mixture is then dried 516 while stirring, to form dried ultra-hard particles covered with metal salts. The mixture is then decomposed 518 by heating in an inert atmosphere, in a wide range of temperatures (as one example, around 1,050° C.), in order to form uniformly-distributed nano-sized metal particles adhered to the surface of the ultra-hard particles. During this decomposition, the metal salts are converted to metal oxides and then to pure metal deposits on the ultra-hard particle surface. Due to the presence of the complexing agent (such as triethanolamine), this reaction takes place without a separate reducing step. The complexing agent itself decomposes to form a reducing atmosphere, to reduce the cobalt oxide to metal.

A mixture of diamond and cobalt particles was formed according to the method of FIG. 11, as follows: 7.4 g of cobalt nitrate dissolved in water ($Co(NO_3)_2.6H_2O$) and 1.9 g triethanolamine were dissolved into 20 g of iso-propanol and mixed to form a clear solution. Then 8.5 g of pre-mixed diamond powder (0.5-1.0 micron) was added to the mixture and stirred. The suspension was dried with gas flow at 50° C. while stirring. The mixture was then decomposed by heating it at 900° C. in a nitrogen ($N_2$) atmosphere. The result was a diamond powder surface coated with 15% by weight cobalt nano-particles.

Figure 12:
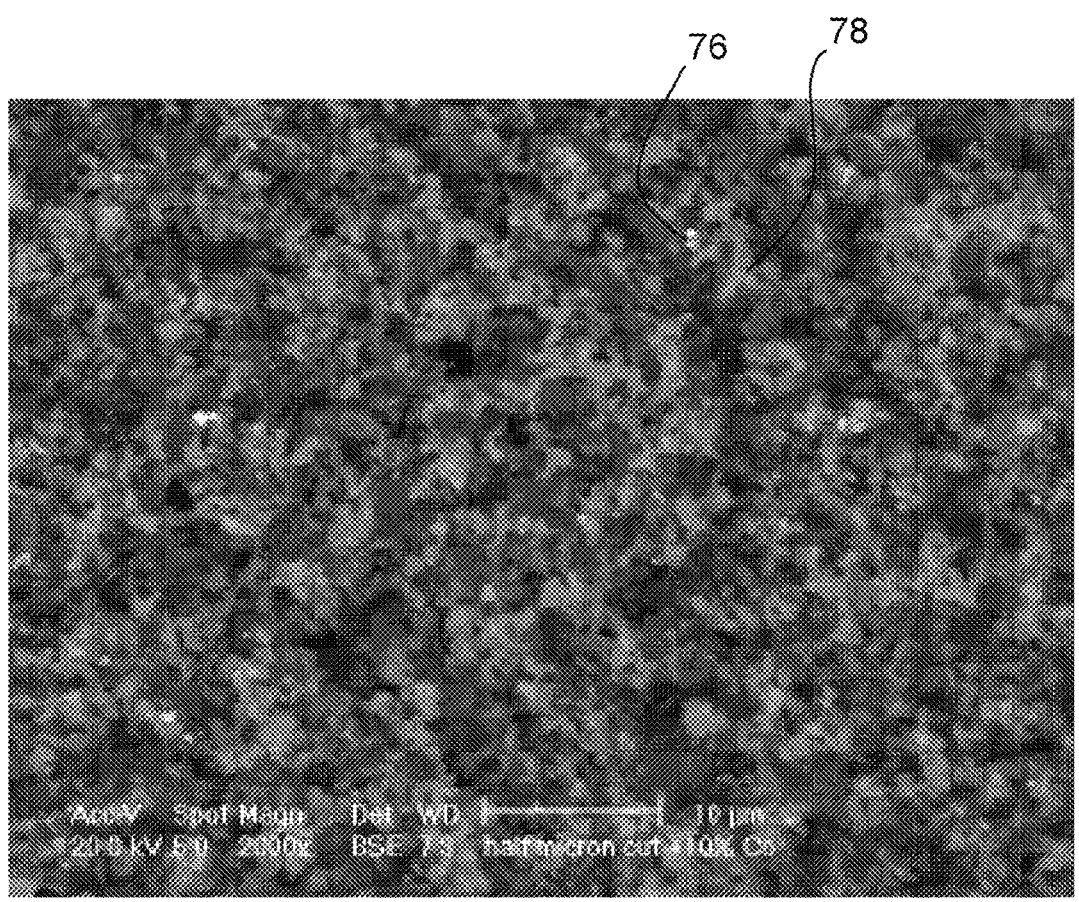
FIG. 12 is an image of a diamond powder mixture according to an exemplary embodiment of the present disclosure, at 2,000 times magnification.

The above mixture was also created with 10% by weight cobalt nano-particles. An image of the resulting diamond powder mixture is shown in FIG. 12. FIG. 12 shows cobalt particles 76 deposited on the diamond particle surfaces 78.

Figure 13A:
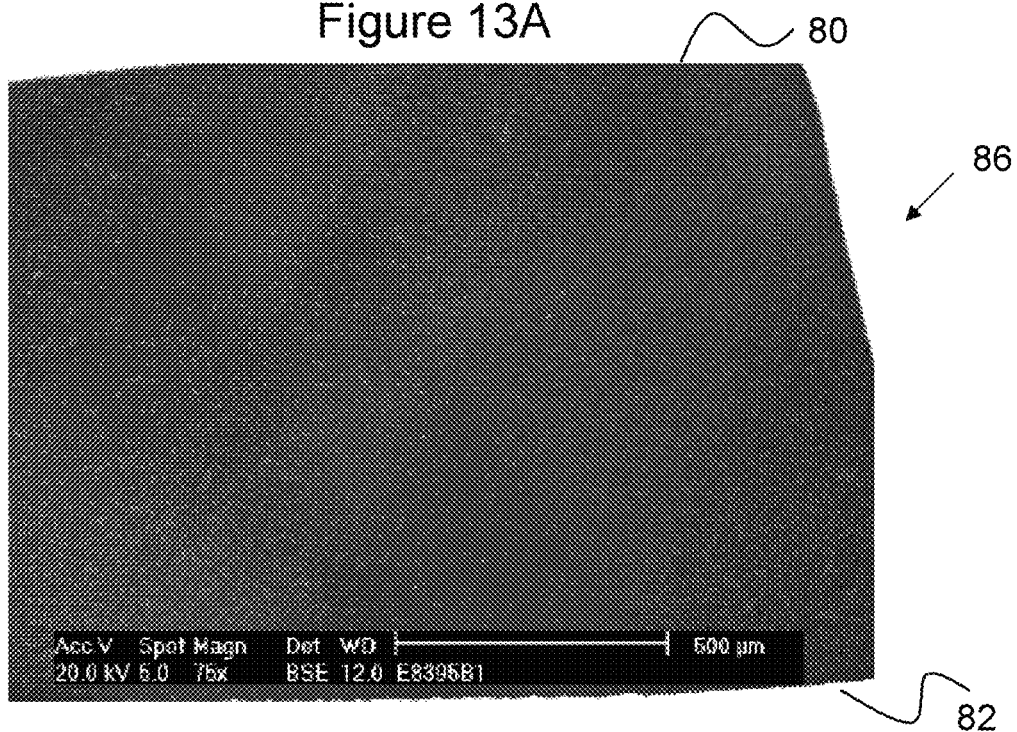
FIG. 13A is an image of a PCD cutting element according to an exemplary embodiment of the present disclosure, at 75 times magnification.
Figure 13B:
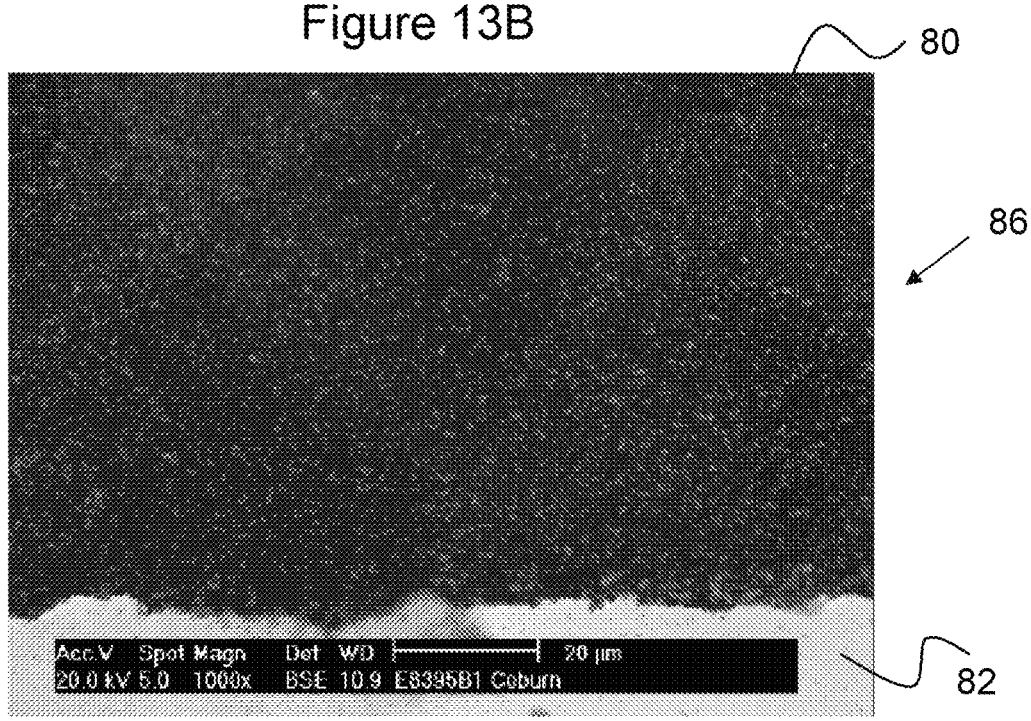
FIG. 13B is an image of the PCD cutting element of FIG. 13A, at 1,000 times magnification.
Figure 14:
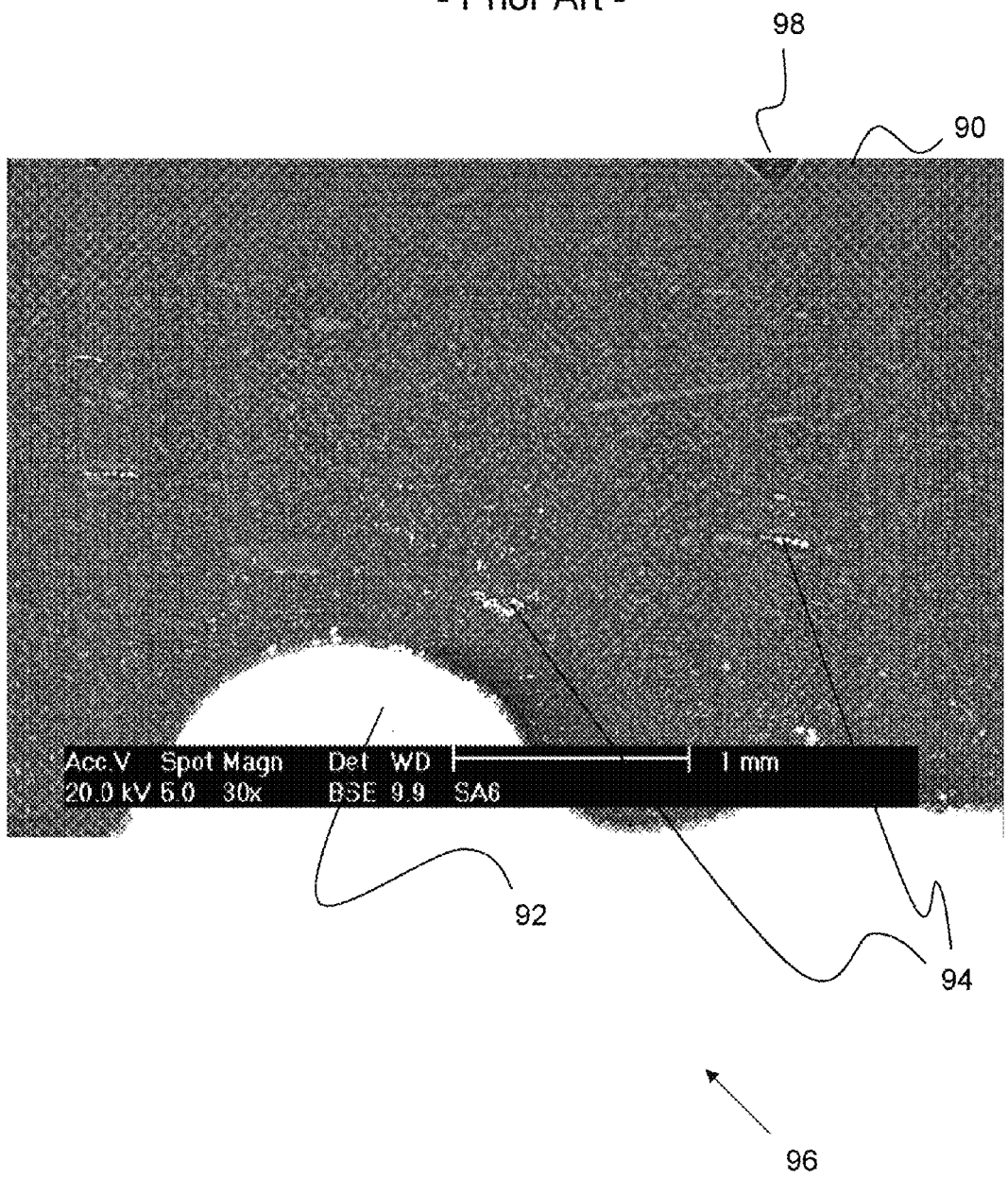
FIG. 14 is an image of a PCD cutting element according to the prior art, at 30 times magnification.

The diamond powder mixture created in this example was then assembled into a can assembly with a substrate and HPHT sintered to form a cutting element 86 having a PCD layer on top of the substrate. Magnified partial views of this cutting element 86 are shown in FIGS. 13A-B. These images show a uniform PCD microstructure 80 formed over the substrate 82. For comparison, a separate PCD cutting element 96 was created through prior art methods and a magnified partial view is shown in FIG. 14. This prior art PCD layer was created by dry mixing a diamond powder blend (0.5-1.0 micron) with submicron cobalt particles. This mixture was HPHT sintered over a tungsten carbide substrate. FIG. 14 shows the sintered PCD layer 90 and substrate 92.

The prior art PCD layer shown in FIG. 14 is less uniform than the sintered PCD layers of FIGS. 13A-B. A uniform PCD layer is one that has an even or consistent distribution of cobalt throughout the PCD layer. In FIGS. 13A-B, the cobalt is uniformly distributed. By contrast, in FIG. 14, the cobalt is less uniformly distributed, having cobalt-rich regions 94 and areas of abnormal grain growth 98. An uneven distribution of cobalt particles in the pre-sintered diamond mixture can result in abnormal grain growth such as the grain growth 98 and cobalt deposits such as cobalt-rich regions 94, as shown in FIG. 14. The result is a sintered PCD layer 90 that has a wide range of diamond particle sizes, some very large such as the grain growth 98 and others much smaller. This range in diamond particle sizes causes inconsistent performance in the cutting element, with some areas of the sintered PCD layer abrading differently than others. For example, the large grain growth 98 can create a large scratch in the work surface. The performance of this cutting element 96 is inconsistent across the PCD layer due to the variation in diamond grain size. By contrast, a uniform cobalt coating prevents abnormal grain growth and produces a sintered PCD layer with a uniform cobalt distribution and a smaller variation in diamond particle sizes, as shown in FIGS. 13A-B. This uniform diamond particle size is desirable so that performance is consistent across the PCD layer.

Embodiments described above provide a diamond or CBN mixture with uniformly distributed deposits of pure metal, to act as a sintering catalyst during HPHT sintering.

The amount of metal deposited on the ultra-hard surface can be carefully controlled by forming discrete, spaced deposits of nano-scale metal particles. With the desired amount of catalyst, strong bonding between the ultra-hard particles is achieved during HPHT sintering, and the resulting PCD (or PCBN) has a uniform microstructure. Moreover, PCD or PCBN with uniform microstructure can be obtained with very fine ultra-hard particles, and the HPHT sintering can be performed at a wide range of temperatures without creating abnormal grain growth. Submicron diamond powder with 5-15% by weight cobalt, formed according to embodiments set forth above, has been HPHT sintered and has shown a Vickers hardness of 45 GPa. In particular, uniform microstructure in ultra-fine PCD or PCBN can be formed by providing a diamond powder with up to 20% or up to 25% catalyst material (such as cobalt) by weight, and optionally up to 10% tungsten by weight (to act as a grain growth inhibitor, as described above).

In any of the embodiments described above, the metal nano-particles may be formed on only a portion of the blended ultra-hard powder mixture. That is, a portion of the ultra-hard mixture may be subjected to the methods described above to form discrete deposits of the metal on the ultra-hard surface, while the remaining portions of the ultra-hard mixture do not have these deposits. According to one or more embodiments, when the entire ultra-hard mixture is assembled for HTHP sintering, a portion of the ultra-hard mixture with catalyst deposits may be provided away from, or opposite, the substrate. That is, the portion of the ultra-hard mixture with the metal deposits may be placed farther away from the substrate, and the portion without the metal deposits is placed nearest the substrate. During the HTHP sintering, catalyst material from the substrate will infiltrate the ultra-hard layer closer to the substrate, but it may not infiltrate far enough through the ultra-hard layer to reach the portions opposite the substrate. Thus, providing the catalyst deposits on only a portion of the ultra-hard mixture can accommodate for infiltration of catalyst material from the substrate, so that the ultra-hard layer does not include too much catalyst near the substrate or too little catalyst away from the substrate.

Notably, embodiments of this present disclosure are described above with reference to depositing catalyst material such as iron group metals. However, these methods are equally useful for depositing other additives if desired. For example, the methods can be used to deposit discrete, spaced-apart particles of a grain growth inhibitor on the ultra-hard particles, if desired. For example, 0.1 to 5% by weight of fine CBN or TiCN particles may be added as a grain growth inhibitor. These particles can be ultrasonically dispersed into the salt solution before drying.

Additionally, the embodiments described above enable nano-scale metal particles to be deposited, but the methods are not limited to nano-size particles. Macro-sized metal particles may be deposited on the ultra-hard surfaces instead of or in addition to nano-sized particles.

The methods described above provide discrete deposits of catalyst material on the ultra-hard particles, rather than providing a uniform coating over the surfaces of the ultra-hard particles. The methods provide tighter control over the amount of catalyst deposited and the resulting ratio of catalyst to ultra-hard material. As described above, embodiments of the methods of the present disclosure enable the desired amount of catalyst material to be precisely controlled, simply by adjusting the amount of metal salt provided in the initial mixing steps. As a result, the desired ratio of catalyst metal deposited on the ultra-hard material can be more consistently obtained.

Ultra-hard materials with very small grain sizes may benefit the most from this approach, due to their large surface area per unit volume. In one embodiment, the ultra-hard particles include diamond particles less than 8 microns in average grain size (meaning the average size of all of the particles is less than 8), for example less than 6 microns, or less than 5 microns, or less than 2.5 microns, or less than 1 micron in average grain size. In an embodiment, the diamond particles include particles less than 5 microns, in another embodiment less than 2 microns, and in another embodiment less than 1 micron. Often the diamond powder is a blend of different grain sizes; in one embodiment the grain sizes may be within the range of approximately 1-8 micron, and in another embodiment approximately 2-5 micron. Consistently coating these very small ultra-hard particles with the desired amount of catalyst is hard to control in the prior art, as explained above. However, the discrete deposits provided by embodiments of this present disclosure enable a precise amount of catalyst material to be deposited.

Although the present invention has been described and illustrated in respect to exemplary embodiments, it is to be understood that it is not to be so limited, since changes and modifications may be made therein which are within the full intended scope of this invention as hereinafter claimed.

What is claimed is:

1. A method of forming a polycrystalline ultra-hard material, comprising:
    mixing a chelating agent in a solution of a dissolved metal salt to form a salt complex in a first solution mixture;
    adding a plurality of ultra-hard material particles to the first solution mixture to form a second solution mixture;
    drying the second solution mixture to form a dried mixture of precipitated metal salt particles adhered to surfaces of the ultra-hard particles;
    heating the dried mixture to convert the metal salt particles into metal deposits on the surfaces of the ultra-hard particles; and
    sintering the mixture of the ultra-hard particles with the metal deposits at a pressure and a temperature sufficient to form intercrystalline bonding of the ultra-hard particles to form a polycrystalline ultra-hard material.

2. The method of claim 1, wherein the metal salt comprises a cobalt salt.

3. The method of claim 2, wherein the cobalt salt comprises cobalt nitrate.

4. The method of claim 2, further comprising adding a tungsten salt to the solution to form tungsten carbide during sintering.

5. The method of claim 2, wherein the ultra-hard particles and the metal deposits on the surfaces of the ultra-hard particles comprise about 1% to about 25% by weight cobalt metal.

6. The method of claim 1, wherein the ultra-hard particles comprise cubic boron nitride particles.

7. The method of claim 1, wherein the ultra-hard particles comprise diamond particles.

8. The method of claim 7, wherein at least some of the diamond particles are less than 5 microns in diameter.

9. The method of claim 7, wherein at least some of the diamond particles are less than 2 microns in diameter.

10. The method of claim 1, wherein heating the dried mixture comprises directly reducing the metal salt particles into the metal deposits.

11. The method of claim 1, wherein heating the dried mixture comprises sequentially decomposing the metal salt particles into a metal oxide and then reducing the metal oxide into the metal deposits.

12. The method of claim 1, wherein heating the dried mixture comprises simultaneously decomposing the metal salt particles into a metal oxide and reducing the metal oxide into the metal deposits.

13. The method of claim 11, wherein the decomposing and reducing are done sequentially.

14. The method of claim 1, wherein the metal deposits comprise metal particles less than 1 micron in diameter.

15. The method of claim 1, wherein the metal of the metal salt is selected from the group consisting of a catalyst metal, a carbide-forming metal, and combinations thereof.

16. The method of claim 1, wherein the metal of the metal salt comprises a catalyst metal selected from the group consisting of cobalt, nickel, iron, and combinations thereof.

17. The method of claim 1, wherein the metal of the metal salt comprises a carbide-forming metal selected from the group consisting of tungsten, niobium, tantalum, titanium, and combinations thereof.

18. The method of claim 17, wherein the ultra-hard particles and the carbide-forming metal deposits on the surfaces of the ultra-hard particles comprise up to 10% by weight carbide-forming metal.

19. The method of claim 1, wherein heating comprises decomposing the mixture to form the metal deposits.

20. The method of claim 1, wherein the sintered polycrystalline ultra-hard material has a uniform microstructure.

21. The method of claim 1, wherein substantially all of the metal in the metal salt particles is deposited as the metal deposits on the surfaces of the ultra-hard particles.

22. The method of claim 21, wherein the metal salt comprises a cobalt salt, and wherein the ultra-hard particles and the metal deposits on the surfaces of the ultra-hard particles comprise about 1% to about 25% by weight cobalt metal.

23. The method of claim 1, wherein said sintering causes said metal deposits to catalyze inter-crystalline bonding between the ultra-hard particles to form said polycrystalline ultra-hard material.

* * * * *